(12) United States Patent
Hadani et al.

(10) Patent No.: US 9,444,514 B2
(45) Date of Patent: Sep. 13, 2016

(54) OTFS METHODS OF DATA CHANNEL CHARACTERIZATION AND USES THEREOF

(71) Applicant: Cohere Technologies, Inc., Santa Clara, CA (US)

(72) Inventors: Ronny Hadani, Austin, TX (US); Shlomo Selim Rakib, Saratoga, CA (US)

(73) Assignee: Cohere Technologies, Inc., Santa Clara, CA (US)

(*) Notice: Subject to any disclaimer, the term of this patent is extended or adjusted under 35 U.S.C. 154(b) by 92 days.

(21) Appl. No.: 14/583,911

(22) Filed: Dec. 29, 2014

(65) Prior Publication Data

US 2015/0117395 A1 Apr. 30, 2015

Related U.S. Application Data

(63) Continuation-in-part of application No. 14/341,820, filed on Jul. 27, 2014, now Pat. No. 9,083,483, which is a continuation of application No. 13/117,119, filed on May 26, 2011, now Pat. No. 8,879,378, application No. 14/583,911, which is a continuation-in-part of application No. 13/430,690, filed on Mar. 27, 2012, now Pat. No. 9,083,595, and a continuation-in-part of (Continued)

(51) Int. Cl.
*H04B 1/692* (2011.01)
*H04L 27/36* (2006.01)
*H04L 5/00* (2006.01)
(Continued)

(52) U.S. Cl.
CPC ............ *H04B 1/692* (2013.01); *H04L 5/0007* (2013.01); *H04L 25/0212* (2013.01); *H04L 25/0226* (2013.01); *H04L 27/366* (2013.01); *H04B 7/10* (2013.01); *H04L 5/0048* (2013.01)

(58) Field of Classification Search
CPC ............... H04L 25/03057; H04L 2025/0349; H04L 2025/03617; H04L 25/03; H04L 25/03828; H04L 25/03847; H04B 3/20; H04B 3/23; H04B 7/015; H04B 10/071; H04B 1/76; H04B 3/10
See application file for complete search history.

(56) References Cited

U.S. PATENT DOCUMENTS

| | | | | |
|---|---|---|---|---|
| 2005/0207334 A1* | 9/2005 | Hadad | ............... | H04L 25/022 370/203 |
| 2011/0007789 A1* | 1/2011 | Garmany | ............ | H04L 25/022 375/224 |
| 2011/0116516 A1* | 5/2011 | Hwang | ............... | H04L 5/0048 370/480 |

(Continued)

OTHER PUBLICATIONS

ISR for WIPO publication WO2016/014596 mailed Oct. 1, 2015.*

*Primary Examiner* — Benjamin H Elliott, IV
(74) *Attorney, Agent, or Firm* — Stephen E. Zweig

(57) ABSTRACT

Fiber, cable, and wireless data channels are typically impaired by reflectors and other imperfections, producing a channel state with echoes and frequency shifts in data waveforms. Here, methods of using OTFS pilot symbol waveform bursts to automatically produce a detailed 2D model of the channel state are presented. This 2D channel state can then be used to optimize data transmission. For wireless data channels, an even more detailed 2D model of channel state can be produced by using polarization and multiple antennas in the process. Once 2D channel states are known, the system turns imperfect data channels from a liability to an advantage by using channel imperfections to boost data transmission rates. The methods can be used to improve legacy data transmission modes in multiple types of media, and are particularly useful for producing new types of robust and high capacity wireless communications using non-legacy OTFS data transmission methods.

27 Claims, 14 Drawing Sheets

Related U.S. Application Data application No. 13/117,119, filed on May 26, 2011, now Pat. No. 8,879,378, application No. 14/583,911, which is a continuation-in-part of application No. 13/927,091, filed on Jun. 25, 2013, now Pat. No. 9,130,638.

(60) Provisional application No. 62/027,231, filed on Jul. 21, 2014, provisional application No. 61/349,619, filed on May 28, 2010, provisional application No. 61/615,884, filed on Mar. 26, 2012, provisional application No. 61/664,020, filed on Jun. 25, 2012.

(51) Int. Cl.
*H04L 25/02* (2006.01)
*H04B 7/10* (2006.01)

(56) References Cited

U.S. PATENT DOCUMENTS

| | | | | |
|---|---|---|---|---|
| 2011/0293030 | A1* | 12/2011 | Rakib | H04L 5/0016 375/267 |
| 2012/0201322 | A1* | 8/2012 | Rakib | H04L 5/0016 375/285 |
| 2014/0169441 | A1* | 6/2014 | Hadani | H04B 1/1027 375/233 |
| 2015/0117395 | A1* | 4/2015 | Hadani | H04L 25/0212 370/330 |
| 2015/0326273 | A1* | 11/2015 | Rakib | H04L 25/0212 375/131 |
| 2015/0327085 | A1* | 11/2015 | Hadani | H04L 5/0023 370/252 |

* cited by examiner

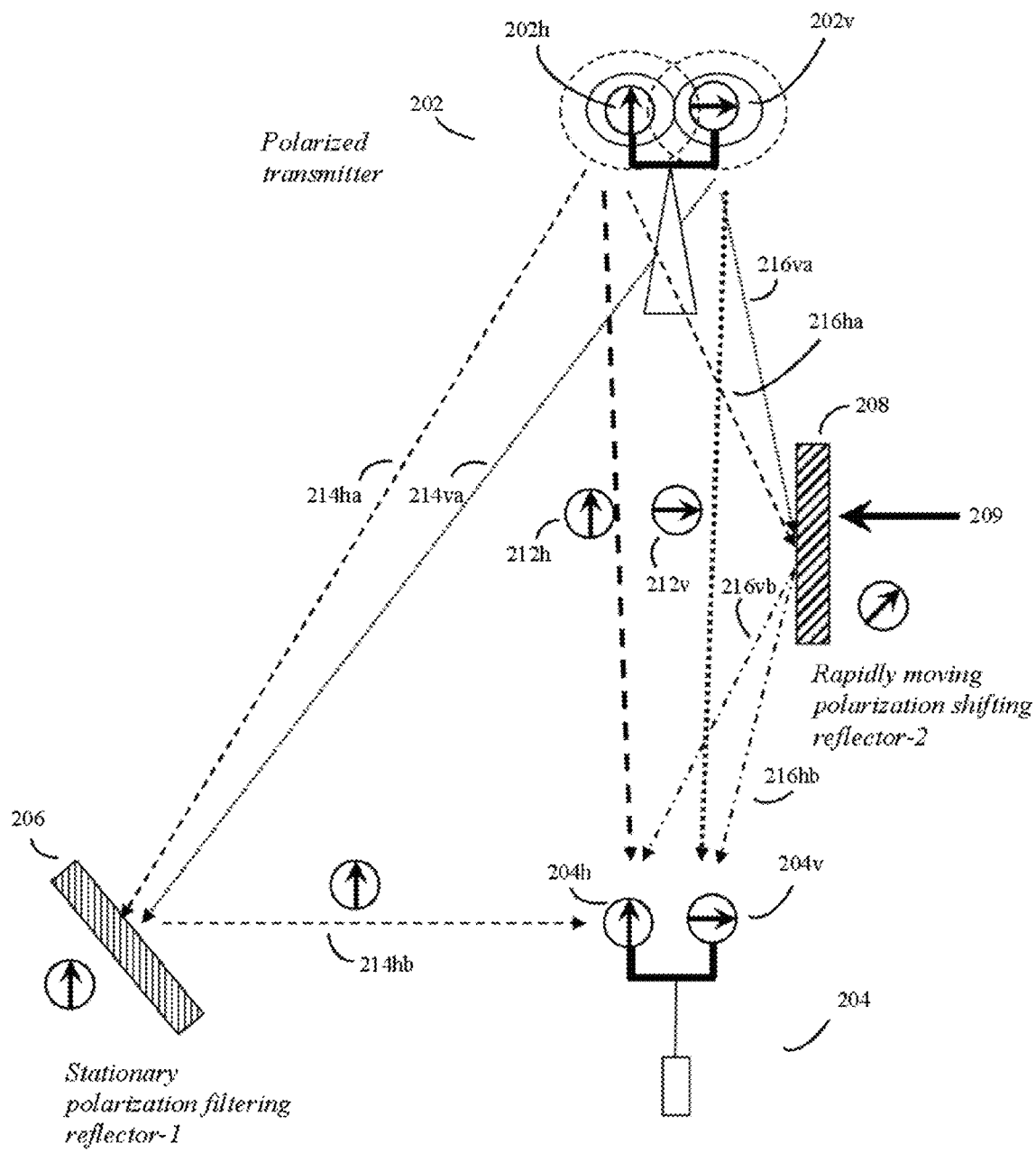

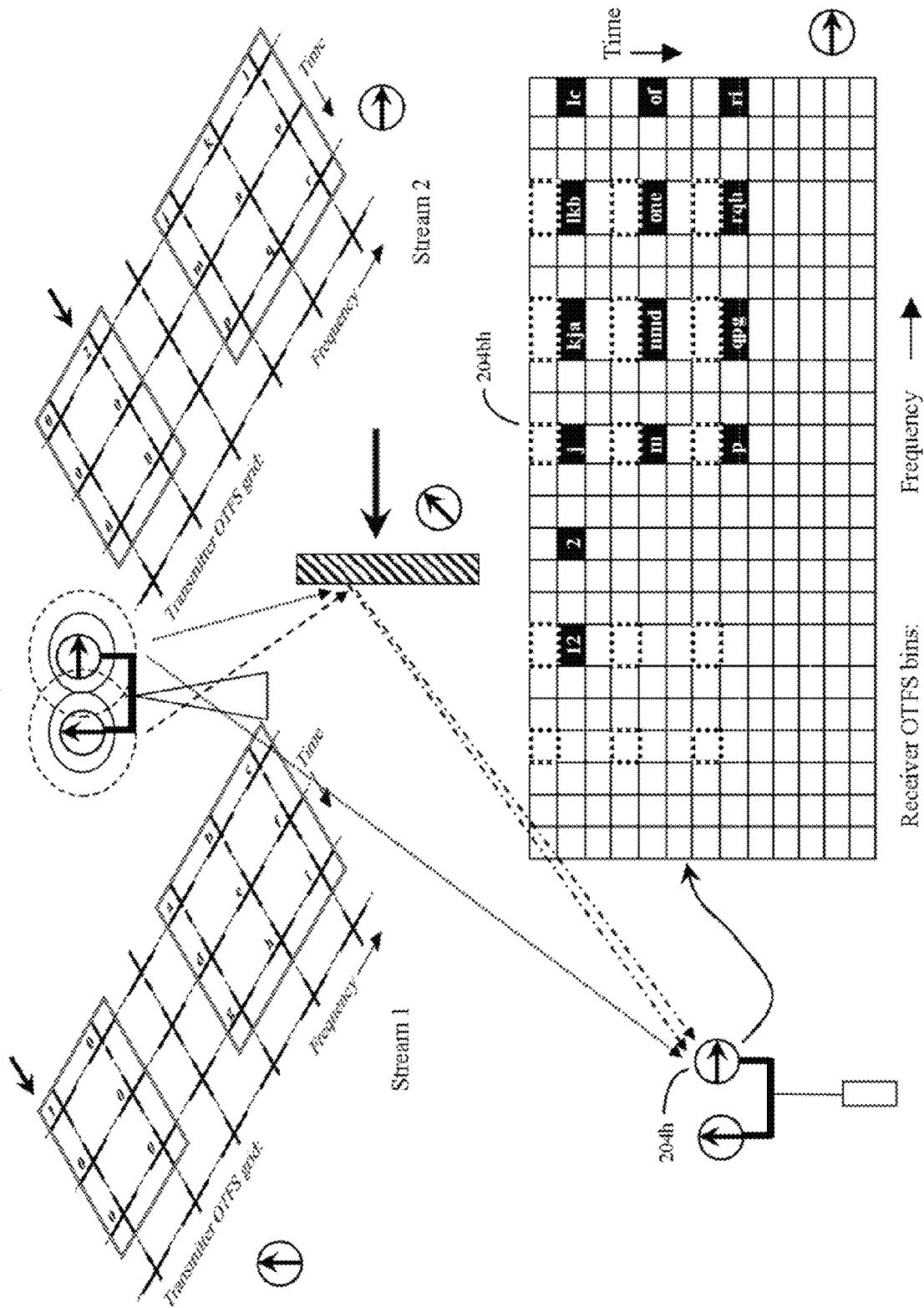

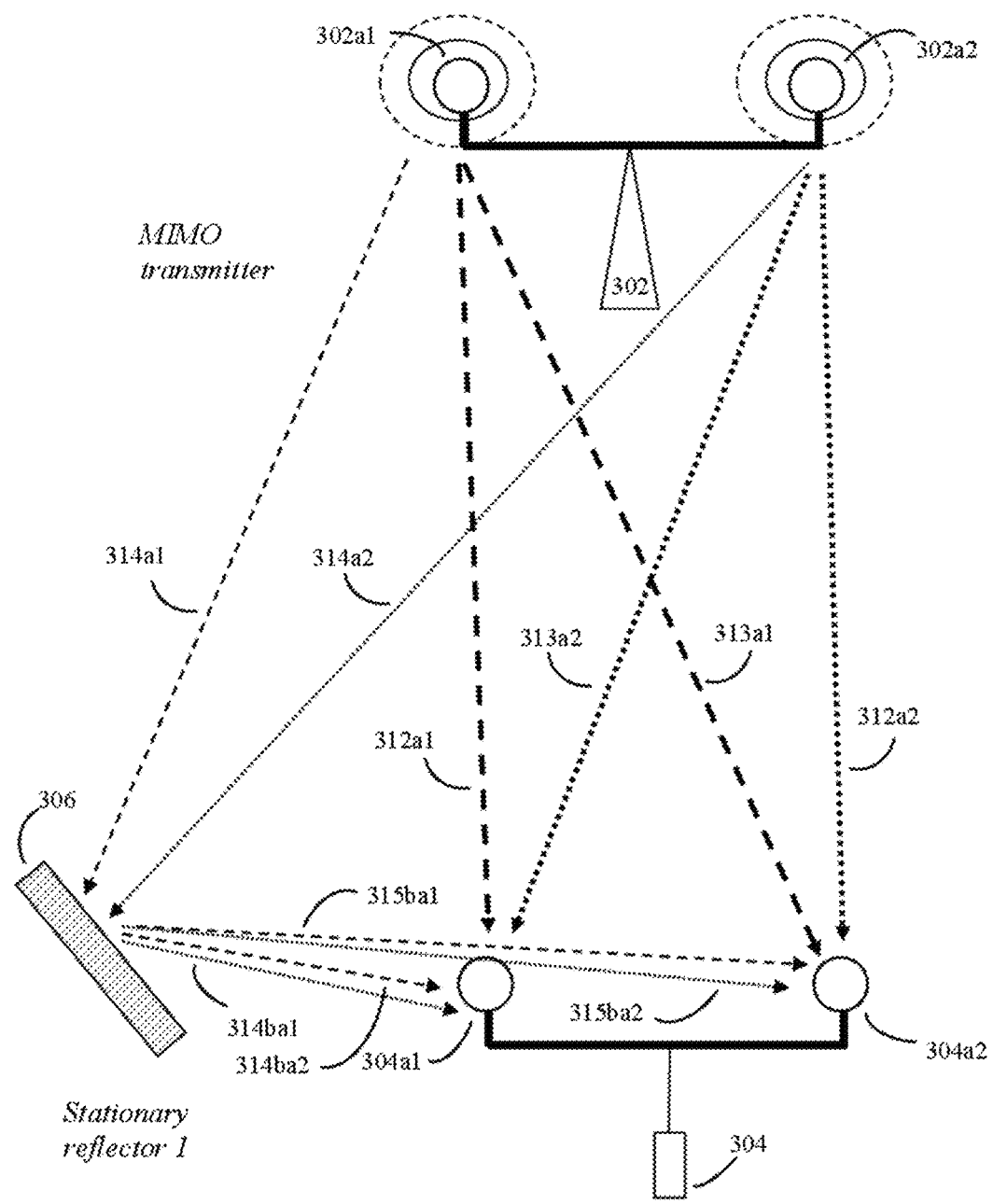

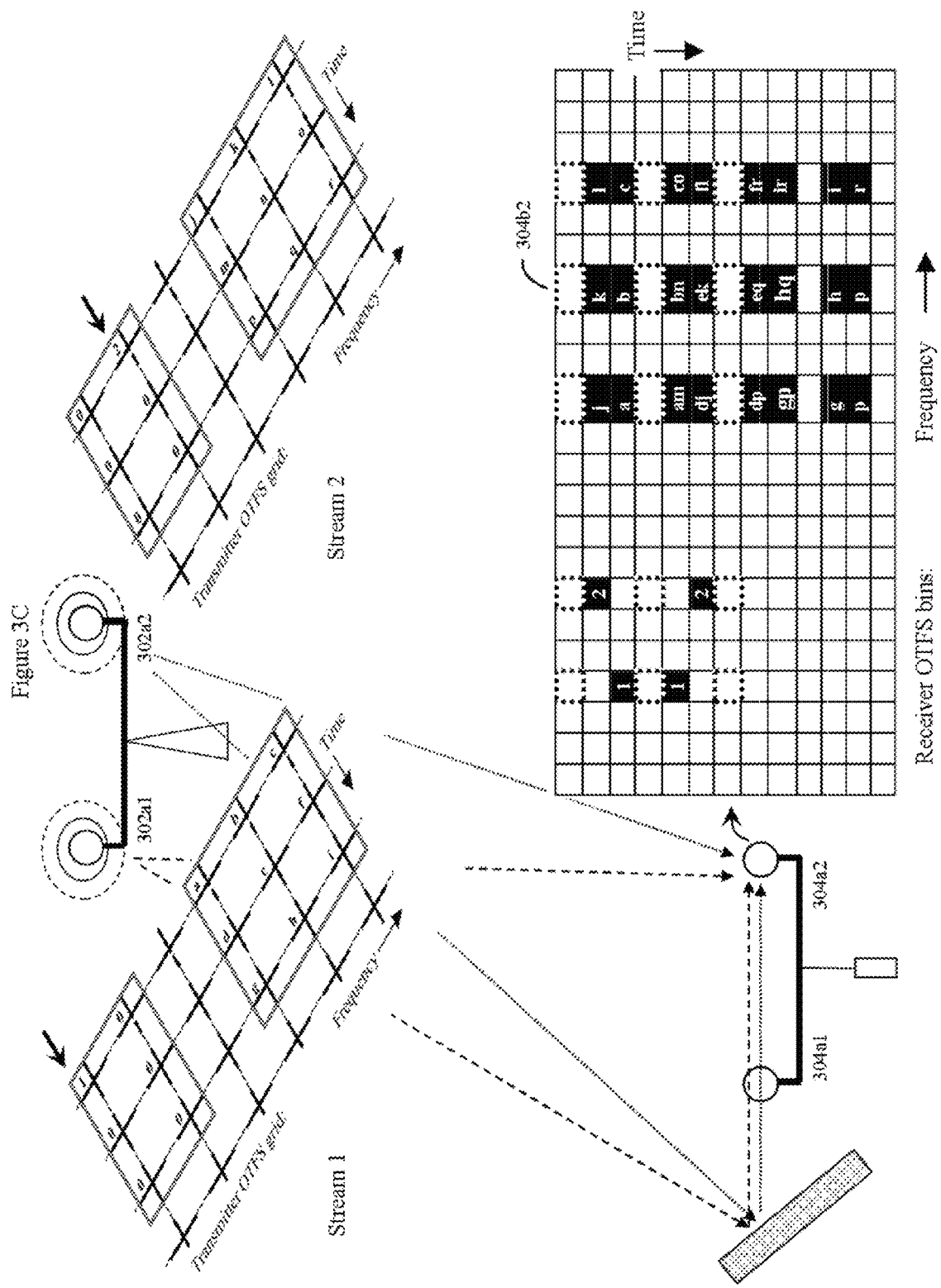

OTFS METHODS OF DATA CHANNEL CHARACTERIZATION AND USES THEREOF

CROSS REFERENCE TO RELATED APPLICATIONS

This application claims the priority benefit of U.S. provisional application 62/027,231, "METHODS OF OPERATING AND IMPLEMENTING WIRELESS OTFS COMMUNICATIONS SYSTEMS", filed Jul. 21, 2014; this application is also a continuation in part of U.S. patent application Ser. No. 14/341,820," ORTHONORMAL TIME-FREQUENCY SHIFTING AND SPECTRAL SHAPING COMMUNICATIONS METHOD", filed Jul. 27, 2014; application Ser. No. 14/341,820 in turn was a continuation of U.S. application Ser. No. 13/117,119, "ORTHONORMAL TIME-FREQUENCY SHIFTING AND SPECTRAL SHAPING COMMUNICATIONS METHOD", filed May 26, 2011, now U.S. Pat. No. 8,879,378; application Ser. No. 13/117,119 claimed the priority benefit of US provisional patent application 61/359,619, "ORTHONORMAL TIME-FREQUENCY SHIFTING AND SPECTRAL SHAPING COMMUNICATIONS METHOD", filed May 28, 2010; This application is also a continuation in part of U.S. patent application Ser. No. 13/430,690, "SIGNAL MODULATION METHOD RESISTANT TO ECHO REFLECTIONS AND FREQUENCY OFFSETS", filed Mar. 27, 2012; application Ser. No. 13/430,690 in turn claimed the priority benefit of US provisional patent provisional application 61/615,884, "SIGNAL MODULATION METHOD RESISTANT TO ECHO REFLECTIONS AND FREQUENCY OFFSETS", filed Mar. 26, 2012; application Ser. No. 13/430,690 was also a continuation in part of U.S. patent application Ser. No. 13/117,119, "ORTHONORMAL TIME-FREQUENCY SHIFTING AND SPECTRAL SHAPING COMMUNICATIONS METHOD", filed May 26, 2011; this application is also a continuation in part of U.S. patent application Ser. No. 13/927,091, filed Jun. 25, 2013, "Modulation and equalization in an orthonormal time-frequency shifting communications system"; application Ser. No. 13/927,091 claimed the priority benefit of U.S. provisional patent application 61/664,020 filed Jun. 25, 2012; the entire contents of all of these applications are incorporated herein by reference.

BACKGROUND OF THE INVENTION

1. Field of the Invention

This invention is in the field of telecommunications, in particular in methods to estimate and compensate for impairments in telecommunications data channels.

2. Description of the Related Art

Prior art on characterizing the channel state of communication data channels

Ever since the advent of the first transatlantic cable back in back in 1858, which to the disappointment of its backers, was only capable of transmitting data at a rate of about 100 words every 16 hours, the impact of imperfect data channels on communications speed and reliability has been apparent to the telecommunications industry.

Making a quick transition to modern times, even modern day electronic wires (e.g. CATV cable), optical fibers, and wireless (radio) methods of data transmission suffer from the effects of imperfect data channels. The data channels are often imperfect because they often contain various signal reflectors that are positioned at various physical locations in the media (e.g. various junctions in a 1D electrical conductor such as wires, or 1D junctions in optical conductors such as optical fiber. For wireless communications, where the media is 3D space, these reflectors can be radio reflectors that are positioned at various locations in space). Regardless of media type and reflector type, reflectors typically distort signal waveforms by creating various echo reflections, frequency shifts, and the like. The net result is that what was originally a clear and easy to interpret signal waveform, sent by a data channel transmitter will, by the time it reaches the receiver, can be degraded by the presence of various echoes and frequency shifted versions of an original signal waveform.

Traditionally, the telecommunications industry has tended to cope with to such problems by using statistical models of these various data channel reflectors and other impairments to create a statistical profile of how the state of a given data channel (channel state) may fluctuate on a statistical basis. Such prior art includes the work of Clarke and Jakes (R. H. Clarke, *A statistical theory of mobile-radio reception, Bell Syst. Tech. J.*, 47, 957-1000 (1968); and W. C. Jakes (ed.), *Microwave Mobile Communications*, Wiley, New York, 1974)) and indeed such methods are often referred to in the industry as Clarke-Jakes models.

These prior art models were useful, because it helped communications engineers conservatively design equipment that would generally be robust enough for various commercial applications. For example, if the statistical model predicted that waveforms too close together in frequency would tend to be smeared onto each other by channel state with some statistical probability, then the communications specifications could designed with enough frequency separation between channels to function to some level of statistical probability. Similarly if the statistical model showed that certain statistical fluctuations in channel states would produce corresponding fluctuations in signal intensity, then the power of the transmitted waveforms, or the maximum rate of data transmission, or both could be designed to cope with these statistical fluctuations.

A good review of these various issues is provided by Pahlavan and Levesque, "*Wireless Information Networks, Second Edition*", 2005, John Wiley & Sons, Inc., Hoboken N.J. This book provides a good prior art review discussing how wireless radio signals are subject to various effects including multi-path fading, signal-drop off with distance, Doppler shifts, and scattering off of various reflectors.

As a specific example of prior art, consider the challenge of designing equipment for mobile cellular phones (cell phones). When a moving cell phone receives a transmission from non-moving cell phone tower (base station), although some wireless energy from the cell phone tower may travel directly to the cell phone, much of the wireless energy from the cell phone tower transmission will typically reflect off of various reflectors (e.g. the flat side of buildings), and these "replicas" of the original cell phone tower transmission will also be received by the cell phone, subject to various time delays and power loss due to the distance between the cell phone tower, the reflector, and the cell phone.

If the cell phone is moving, reflected "replica" of the original signal will also be Doppler shifted to a varying extent. These Doppler shifts will vary according to the relative velocity and angle between the cell phone tower, the cell phone, and the location of the various buildings (reflectors) that are reflecting the signal.

According to prior art such as the Clarke-Jakes models, statistical assumptions can be made regarding average distributions of the transmitters, receivers, and various reflectors. This statistical model can then, for example be used to help set system parameters and safety margins so that, to a certain level of reliability, the system still function in spite of these effects. Thus prior art allowed reasonably robust and commercially useful systems to be produced.

Polarization Effects:

Certain types of waves, such as light waves and radio waves, can oscillate in various directions or orientations. For example, wireless (radio waves) can be linearly polarized in a single direction, such as horizontal or vertical directions, or they can be circularly polarized so that the direction of the field rotation can vary in a clockwise or counterclockwise manner. For example, wireless antennas often can be configured to transmit linear polarized wireless waveforms.

Often, transmitted light waves and/or radio waves consist of a coherent or incoherent mixture of various types of polarized waves. Generally if there is an equal mix of all polarization types, then the wave is considered to be not polarized. Conversely if one polarization type dominates, the wave is considered to be polarized according to the dominant polarization mode.

Reflectors often do not reflect all polarized waves in exactly the same way. Instead reflectors often absorb some polarization modes, while reflecting other polarization modes. For example, specular reflectors (specular reflection) often only reflects one direction of polarization, which is why polarized sunglasses are often used to cut down on glare. Other types of reflectors, such as such as ground reflection of wireless signals, or reflection off of irregular metal objects, can end up shifting the polarization angle of the reflected waves.

MIMO Techniques

MIMO (multiple-input and multiple-output) radio methods are commonly used for many applications including WiFi and 3G MIMO techniques. The basic principles behind MIMO are described in various US patents such as Roy, U.S. Pat. No. 5,515,378, Paulraj, U.S. Pat. No. 5,345,599, various papers such as Golden et. al., "Detection algorithm and initial laboratory results using V-BLAST space-time communication architecture" ELECTRONICS LETTERS 35(1) Jan. 7, 1999.

Phased Array Techniques

Phased array antennas are used for a broad range of applications, including RADAR, radio astronomy, AM and FM broadcasting, and the like. On the transmitter side, the basic concept is to operate multiple (e.g. N) transmitters or receivers according to the principles of N-slit diffraction. Thus for transmission, each of the N transmitters will emit the same waveform, each offset by a different phase shift angle. Due to diffraction principles of constructive interference and destructive interference, depending on the phase shift angle, the sum of the resulting waveforms from the N different antennas will impart directionality to the resulting transmitted beam. Similarly, for receiving, the receiver will monitor or detect the phase shifts between the same waveforms as received by N different receiving antennas, thus in effect imparting directionality to the receiver antenna array as well. Patents on phased array methods include Shimko, U.S. Pat. No. 4,931,803, and others.

Review of OTFS Methods

As previously discussed, modern electronics communications, such as optical fiber communications, electronic wire or cable based communications, and wireless communications all operate by modulating signals and sending these signals over their respective optical fiber, wire/cable, or wireless mediums or communications channels. Here these various media are often referred to as "data channels". In the case of optical fiber and wire/cable, often these data channels comprise a physical medium (e.g. the fiber or cable), often comprising at least one dimension of space and one dimension of time.

In the case of wireless communications, often these data channels will consist of the physical medium of space (and any objects in this space) comprising three dimensions of space and one dimension of time. (Note however, that in the most commonly used commercial setting of ground based wireless applications, often the third spatial dimension of height can be less important, and thus ground based wireless applications can often be adequately approximated as a two dimensional medium of space (with objects) with one dimension of time.)

As previously discussed, as signals travel through a data channel, the various signals (e.g. waveforms), which (at least in the case of optical, wireless, or electric signals) often travel at or near the speed of light, are generally subject to various types of degradation or channel impairments. As per the previous example, echo signals can potentially be generated in an optical fiber or wire/cable medium whenever a signal encounters junctions in the optical fiber or wire/cable. Echo signals can also potentially be generated when wireless signals bounce off of wireless reflecting surfaces, such as the sides of buildings, and other structures. Similarly frequency shifts can occur when the optical fiber or wire/cable propagating signal passes through different regions of fiber or cable with somewhat different signal propagating properties or different ambient temperatures. For wireless signals, signals transmitted to or from a moving reflector, or to or from a moving vehicle are subject to Doppler shifts that also result in frequency shifts. Additionally, the underlying equipment (i.e. transmitters and receivers) do not always operate perfectly, and can produce frequency shifts as well.

These echo effects and frequency shifts are unwanted, and if such shifts become too large, can result in lower rates of signal transmission, as well as higher error rates. Thus methods to reduce such echo effects and frequency shifts are of high utility in the communications field.

In previous work, exemplified by applicant's US patent applications U.S. 61/349,619, U.S. Ser. Nos. 13/430,690, and 13/927,091 as well as U.S. Pat. Nos. 8,547,988 and 8,879,378, applicant taught a novel method of wireless signal modulation that operated by spreading data symbols over a larger range of times, frequencies, and spectral shapes (waveforms) than was previously employed by prior art methods (e.g. greater than such prior art methods as Time Division Multiple Access (TDMA), Global System for Mobile Communications (GSM), Code Division Multiple Access (CDMA), Frequency Division Multiple Access (FDMA), Orthogonal Frequency-Division Multiplexing (OFDM), or other methods).

Applicant's methods, previously termed "Orthonormal Time-Frequency Shifting and Spectral Shaping (OTFSS)" in U.S. Ser. No. 13/117,119 (and subsequently referred to by the simpler "OTFS" abbreviation in later patent applications such as U.S. Ser. No. 13/430,690) operated by sending data in larger "chunks" or frames than previous methods. That is, while a prior art CDMA or OFDM method might encode and send units or frames of "N" symbols over a communications link (e.g. data channel) over a set interval of time, applicant's OTFS methods would typically be based on a minimum unit or frame of $N^2$ symbols, and often transmit these $N^2$ symbols over longer periods of time.

In some OTFS modulation embodiments, each data symbol or element that is transmitted was also spread out to a much greater extent in time, frequency, and spectral shape space than was the case for prior art methods. As a result, at the receiver end, it often took longer to start to resolve the value of any given data symbol because this symbol had to be gradually built-up or accumulated as the full frame of $N^2$ symbols is received.

Thus applicant's prior work taught a wireless communication method that used a combination of time, frequency and spectral shaping to transmit data in convolution unit matrices (data frames) of N·N ($N^2$) (e.g. N×N, N times N) symbols. In some embodiments, either all $N^2$ data symbols are received over N spreading time intervals (e.g. N wireless waveform bursts), or none were (e.g. receiving N bursts was required in order to reconstruct the original data bits). In other embodiments this requirement was relaxed.

To determine the times, waveforms, and data symbol distribution for the transmission process, the $N^2$ sized data frame matrix could, for example, be multiplied by a first N·N time-frequency shifting matrix, permuted, and then multiplied by a second N·N spectral shaping matrix, thereby mixing each data symbol across the entire resulting N·N matrix. This resulting data matrix was then selected, modulated, and transmitted, on a one element per time slice basis, as a series of N OTFS symbol waveform bursts. At the receiver, the replica matrix was reconstructed and deconvoluted, revealing a copy of the originally transmitted data.

For example, in some embodiments taught by U.S. patent application Ser. No. 13/117,119, the OTFS waveforms could be transmitted and received on one frame of data ([D]) at a time basis over a communications link, typically using processor and software driven wireless transmitters and receivers. Thus, for example, all of the following steps were usually done automatically using at least one processor.

This first approach used frames of data that would typically comprise a matrix of up to $N^2$ data elements, N being greater than 1. This method was based on creating an orthonormal matrix set comprising a first N×N matrix (VD and a second N×N matrix ([$U_2$]). The communications link and orthonormal matrix set were typically chosen to be capable of transmitting at least N elements from a matrix product of the first N×N matrix ([$U_1$]), a frame of data ([D]), and the second N×N matrix ([$U_2$]) over one time spreading interval (e.g. one burst). Here each time spreading interval could consist of at least N time slices. The method typically operated by forming a first matrix product of the first N×N matrix ([$U_1$]), and the frame of data ([D]), and then permuting the first matrix product by an invertible permutation operation P, resulting in a permuted first matrix product P([$U_1$][D]). The method then formed a second matrix product of this permuted first matrix product P([$U_1$][D]) and the second N×N matrix ([$U_2$]) forming a convoluted data matrix, according to the method, this convoluted data matrix could be transmitted and received over the wireless communications link.

On the transmitter side, for each single time-spreading interval (e.g. burst time), the method operated by selecting N different elements of the convoluted data matrix, and over different time slices in this time spreading interval, the method used a processor and typically software controlled radio transmitters to select one element from the N different elements of the convoluted data matrix, modulate this element, and wirelessly transmit this element so that each element occupied its own time slice.

On the receiver side, the receiver (typically a processor controlled software receiver) would receive these N different elements of the convoluted data matrix over different time slices in the various time spreading intervals (burst times), and demodulate the N different elements of this convoluted data matrix. These steps would be repeated up to a total of N times, thereby reassembling a replica of the convoluted data matrix at the receiver.

The receiver would then use the first N×N matrix ([$U_1$]) and the second N×N matrix ([$U_2$]) to reconstruct the original frame of data ([D]) from the convoluted data matrix. In some embodiments of this method, an arbitrary data element of an arbitrary frame of data ([D]) could not be guaranteed to be reconstructed with full accuracy until the convoluted data matrix had been completely recovered. In practice, the system could also be configured with some redundancy so that it could cope with the loss of at least a few elements from the convoluted data matrix.

U.S. patent application Ser. No. 13/117,119 and its provisional application 61/359,619 also taught an alternative approach of transmitting and receiving at least one frame of data ([D]) over a wireless communications link, where again this frame of data generally comprised a matrix of up to $N^2$ data elements (N being greater than 1). This alternative method worked by convoluting the data elements of the frame of data ([D]) so that the value of each data element, when transmitted, would be spread over a plurality of wireless waveforms, where each individual waveform in this plurality of wireless waveforms would have a characteristic frequency, and each individual waveform in this plurality of wireless waveforms would carry the convoluted results from a plurality of these data elements from the data frame. According to the method, the transmitter automatically transmitted the convoluted results by cyclically shifting the frequency of this plurality of wireless waveforms over a plurality of time intervals so that the value of each data element would be transmitted as a plurality of cyclically frequency shifted wireless waveforms sent over a plurality of time intervals, again as a series of waveform bursts. At the receiver side, a receiver would receive and use a processor to deconvolute this plurality of cyclically frequency shifted wireless waveforms bursts sent over a plurality of times, and thus reconstruct a replica of at least one originally transmitted frame of data ([D]). Here again, in some embodiments, the convolution and deconvolution schemes could be selected so such that an arbitrary data element of an arbitrary frame of data ([D]) could not be guaranteed to be reconstructed with full accuracy until substantially all of the plurality of cyclically frequency shifted wireless waveforms had been transmitted and received as a plurality of waveform bursts. In practice, as before, system could also be configured with some redundancy so that it could cope with the loss of at least a few cyclically frequency shifted wireless waveforms.

In other embodiments, the methods previously disclosed in U.S. patent application Ser. Nos. 13/927,091; 13/927,086; 13/927,095; 13/927,089; 13/927,092; 13/927,087; 13/927,088; 13/927,091; and/or provisional application 61/664,020 may be used for some of the OTFS modulation methods disclosed herein. The entire contents of U.S. patent application Ser. Nos. 62/027,231, 13/927,091; 13/927/086; 13/927,095; 13/927,089; 13/927,092; 13/927,087; 13/927,088; 13/927,091; and 61/664,020 are incorporated herein in their entirety.

BRIEF SUMMARY OF THE INVENTION

The invention is based, in part, on the insight that modern electronics and modern signal processing methods now make it possible to supplant the earlier statistical based models of channel states, such as the previously discussed Clarke-Jakes model, with actual knowledge of the exact state of the data channel, and this actual knowledge can then be used to achieve much higher levels of data transmission speed, fade resistance, and reliability. Indeed improvements of one or even two or more orders of magnitude over prior art can be realized according to the methods described herein.

As previously discussed, data channels, such as fiber, cable, and wireless data channels, are typically impaired by the presence of reflecting structures (reflectors) and other channel imperfections placed at unknown locations along the data channel. These reflecting structures end up putting the channel into an unknown channel state in which transmitted waveforms traveling over the channel end up producing various types of echoes and frequency shifts by the time the waveforms hit the receiver. The sum total of these various imperfections can be called the "channel state" of the data channel.

The invention is based, in part on the insight that prior art methods of estimating the state of data channels, such as the earlier Clarke-Jakes model, tend to view the actual channel state of any given real-world data channel as being essentially indeterminable. Instead prior art methods simply tried to describe statistical average data channels, and teach conservative methods of operation that will tend to be robust to statistical fluctuations about this average model. The cost of this prior art approach is that on the one hand, when the actual channel state is better than the statistical average, then the statistical data channel approach artificially limits the rate that data is sent to a level far lower than the data channel could actually support. Alternatively, when the actual channel state is significantly worse than the statistical average, then instead of gracefully adapting to the poor channel state, prior art methods will instead experience apparently random signal fading events, and operate unreliably.

The invention is based, in part, on the insight that OTFS methods, previously used to produce a more generally robust type of communications over a broad range of channel states, can also be used for a different purpose—producing highly accurate real-time (or near real-time) models of data channel states. Once such highly accurate real-time or near real-time models of the channel state are available, then processor equipped transmitters and receivers can use this information to automatically adjust their modes of data transmission and reception to continually adjust for the real-world channel state of the data channel. This helps insure that the data channel can always be operated at a much higher rate (often near the physical limits for that particular data channel and channel state), and at the same time operate more deterministically because the system can automatically compensate for various channel impairments.

In this disclosure, methods of using OTFS pilot symbol waveform bursts to automatically produce at least a detailed 2 dimensional model of the channel state are presented.

This method is based, in part, on the insight that although the actual channel state of a real world data channel may be very complex, the practice of following prior art, which teaches simply giving up and resorting instead to statistical models, can be abandoned. Instead greatly superior results can be obtained by using OTFS type pilot signal methods that, often in real time, operate to map the complexities of the actual channel state into at least a simplified 2 dimensional representation of the channel state. Although this 2 dimensional representation of the channel state (here called the 2D channel state) is of course still just an approximation of the "real" channel state, it can be very useful because this 2D channel state can then be automatically used by the system to continually optimize data transmission.

As will be discussed, the invention's use of OTFS pilot signals to produce 2D channel state information can be broadly used in many aspects of the telecommunications industry. Once the 2D channel state of even a legacy data channel transmitting legacy signals is understood, this 2D channel state can be automatically used by even legacy transmitters and receivers to improve operation. Indeed, as an extreme example, if a time machine was available, the invention's OTFS pilot signal methods described herein could even have been used to produce improved waveforms by which to transmit and receive Morse code on the original 1858 transatlantic cable.

Although the methods described herein can thus be usefully employed with optical fiber media, conducting wire media, using various types of legacy signal transmission methods, in other embodiments, the 2D channel state determination (acquisition) methods described herein are extremely useful for wireless applications.

For wireless data channels, an even more detailed 2D model of channel state can be produced by using polarization and multiple antennas in the pilot signal process. Once the 2D channel states are known, the methods described herein can paradoxically and non-intuitively turn imperfect data channels from a liability to an advantage, by automatically using channel imperfections (exposed and characterized by the 2D channel state) to further boost data transmission rates.

Thus the OTFS pilot signal methods and 2D channel state acquisition methods described herein can be used to improve legacy data transmission modes in multiple types of media, and are particularly useful for producing new types of robust and high capacity wireless communications using non-legacy OTFS data transmission methods.

Briefly, and as an oversimplification that is not intended to be limiting, these methods operate by using OTFS pilot signal methods to acquire the 2D channel state of an impaired data channel. This can be done by sending OTFS encoded pilot regions that are chosen to allow the impact of the impaired data channel on the pilot symbol waveforms to be both detectable and quantifiable. These OTFS pilot symbols are typically transmitted as a series of OTFS pilot waveform bursts, often spaced by time and frequency according to an OTFS time-frequency grid. These pilot symbols, although often described as a plurality of pilot symbols) can include as little as at least one actually transmitted pilot symbol, along with other zero (empty spaces) or baseline pilot symbols along other OTFS time-frequency grid coordinates.

The receiver will typically be configured to receive channel convoluted OTFS pilot bursts according to a receiver bin structure that characterizes the received OTFS pilot bursts according to frequency and time of arrival. Typically the resolution of the receiver bin structure will be finer (e.g. frequency and time divisions will be smaller, so as to produce higher resolution) than the resolution of the transmitter OTFS time-frequency grid so that relatively small shifts in frequency and time of arrival can be analyzed. The pilot symbols, transmitter OTFS time frequency grid, and the receiver bin structure can be chosen so as to enable the method to detect at least some 2D channel state effects for that particular 2D channel state.

The receiver can then analyze the channel convoluted OTFS pilot bursts, as received according to the receiver bin structure, and determine at least one 2D impulse response to describe how the impaired data channel distorted the OTFS pilot bursts, and in particular how the impaired data channel may have projected an OTFS pilot bursts from its normally expected (absent channel state effects) receiver bin coordinates into other receiver bin coordinates that correspond to time delayed or frequency shifted versions of the original OTFS pilot bursts. Here various 2D transformation methods, such as Z-transform methods, matrix methods, and other transformation methods may be used. In some embodiments, data symbols may be also transmitted along with the pilot signals. Here often the inverse of the transform that describes how the OTFS pilot burst was distorted by the data channel, or projections of this transform, will also suffice to clean up channel caused distortion in the data symbols as well.

As will be described, these methods can be still further enhanced by in effect adding extra dimensions to the basic 2D channel state acquisition methods described herein. The extra dimension of polarization can be used to help further discriminate between different types of reflectors. The extra dimension antenna spatial separation (often in conjunction with monitoring waveform phase or waveform directionality) can also be used to provide more accurate 2D channel state information because these methods can further distinguish between various combinations of multiple spatially separated transmitting antennas, receiving antennas, and reflectors in space.

It often is unfeasible, if only prior art methods are used, to transmit multiple streams of data (using a transmitter with multiple antennas, to a receiver with multiple antennas) using the same time, frequency, and waveform basis shape. This is because prior art receivers are often unable to distinguish between these multiple streams. An additional problem is that prior art, which tends to assume that data channels are either perfect or impossible to characterize by other than statistical methods, teaches that multiple streams can become hopelessly convoluted as they travel through the data channel, not unlike an unbreakable code, and be hopelessly jumbled by the time they reach the receiver.

However by using at least the more sophisticated versions of the 2D channel state acquisition methods described here, the transmitter and receiver can utilize their superior knowledge about the 2D channel state to take advantage of reflectors and other channel imperfections to help separate out the data coming from the different streams. The net effect is a bit paradoxical, in that by using these methods, an "imperfect" data channel, cluttered with various reflectors, some of which may be moving, may actually support a substantially higher rate of data transmission than a perfect data channel that has no reflectors and no clutter.

BRIEF DESCRIPTION OF THE DRAWINGS

FIG. 1B also shows how direct OTFS pilot bursts (e.g. bursts traveling directly from the transmitter to the receiver without any reflections) are received at the receiver.

FIG. 2A shows how polarized OTFS pilot symbol waveform bursts can be used to further distinguish between different types of reflectors in the impaired data channel.

FIG. 2C is essentially the same as FIG. 2B, except that here the receiver reception on the receiver's horizontal polarized antenna OTFS time-frequency bin structure is shown.

FIG. 3A shows how the system may also use MIMO (spatially separated transmitting and receiving antennas) and OTFS pilot symbol and data symbol waveform bursts to both further characterize the 2D channel state of the data channel, and also send multiple streams of data simultaneously.

FIG. 3C is essentially a repeat of FIG. 3B, except that here the signals received by the MIMO receiver's other spatially separated antenna, and corresponding bin arrangement, is shown.

DETAILED DESCRIPTION OF THE INVENTION

Figure 1A:
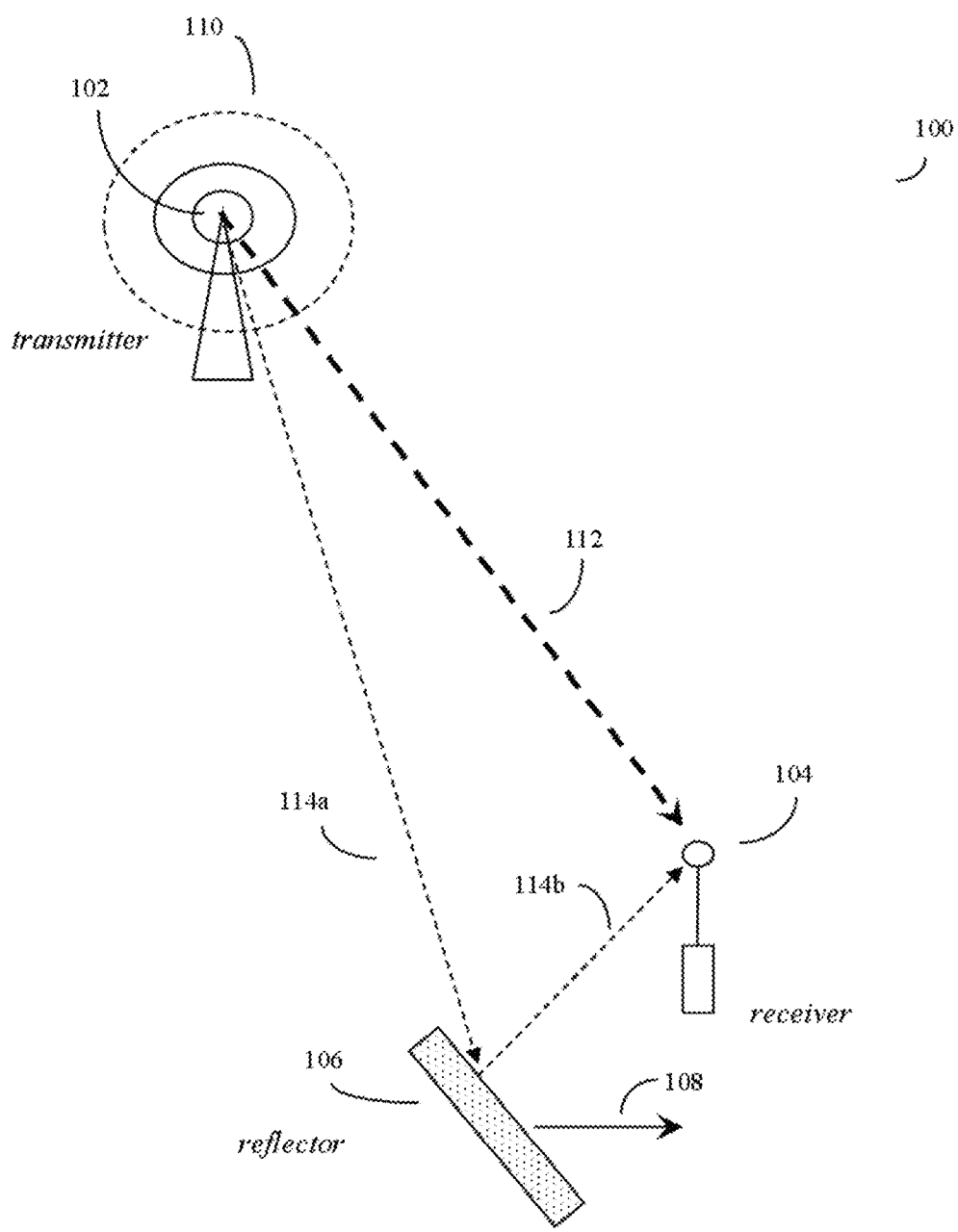
FIG. 1A shows a simplified model of a wireless data channel connecting a single transmitter and a single receiver. This simplified model has only one signal reflector.

As previously discussed, the invention is based in part on the insight that in contrast to prior art methods such as the earlier Clarke-Jakes model, that tended to view variations in signal strength (e.g. occasional signal fading, how long a signal remains coherent, how large a range of signal frequency ranges can be expected to be coherent) as something that can only be handled by statistical methods, superior results can be obtained if the underlying structure of a data channel (communications channel) is exposed, and the various causes of signal distortion (e.g. various reflections, frequency shifts, other shifts and the like) are instead sorted out or "solved for".

The main focus of this disclosure will be on wireless data channels that transmit data (often using radio signals of various frequencies up into the microwave frequencies and beyond) though three dimensions of space (often on earth, where the "space" may be filled with air and even other natural airborne objects such as clouds, raindrops, hail and the like) and one dimension of time. However many of the concepts disclosed herein can also be used for other data channels operating in other media (e.g. water, conductive metals, transparent solids, and the like). Thus use of wireless examples is not intended to be limiting.

The invention makes use of modern electronic components, such as processors (e.g. microprocessors, which can even be commonly used processors such as the popular Intel x86 series of processors), and digital signal processors; and often will employ modern software configured wireless transmitters and receivers which can, for example, be implemented by various field programmable gate arrays (FPGA). Here the methods of Harris, "Digital Receivers and Transmitters Using Polyphase Filter Banks for Wireless Communications", IEEE transactions volume 51 (4), April 2003, pages 1395-1412. Application specific integrated circuits (ASICs) and other types of devices and methods may also be used.

One unique aspect of the invention is that it often transmits its pilot symbols and data symbols as well, in the form of orthogonal time shifted and frequency shifted wireless waveform bursts, often referred to in this specification as OTFS pilot and data symbols and OTFS pilot and data waveform bursts. These OTFS waveform bursts can be implemented by various methods, such as those previously disclosed in parent applications U.S. 61/349,619, U.S. Ser. No. 13/430,690, 13/927,091 as well as U.S. Pat. Nos. 8,547,988 and 8,879,378; all of which are incorporated herein by reference in their entirety. Although these earlier disclosures thus contain a more detailed discussion of various aspects of OTFS waveform technology, as well as a more detailed discussion as to various methods to implement OTFS symbols and data frames, some important aspects from these disclosures will be reiterated herein.

At least as far as transmitting data is concerned, OTFS methods work by essentially spreading out each transmitted data bit throughout a plurality of orthogonal time shifted and frequency shifted wireless waveform bursts so that essentially every data bit ends up traveling from the destination to the receiver through multiple mutually orthogonal wireless waveform data bursts, all based on permutations of the same basis waveform, distributed over a given time and frequency range. For efficiencies sake, a large number of data symbols (each potentially comprising multiple bits of data) are handled simultaneously. Typically the OTFS matrix math (usually handled by the transmitter processor) will repackage these data symbols into a plurality of OTFS data symbols, each OTFS data symbol in essence containing a portion of each data bit being transmitted). These OTFS data symbols are used to control the modulation of each different OTFS waveform burst, and the data is transmitted in the form of OTFS symbol modulated OTFS waveform bursts. With regards to receiving data, the receiver essentially has to wait to receive an entire batch (data frame) of OTFS symbols before it can begin the process of using matrix math to in essence use the received OTFS symbols to solve for the originally transmitted data bits. Note however that OTFS pilot symbols are not used to transmit data, and thus need not be subject to these limitations.

Thus in contrast to legacy communications methods, where some bits may be subject to fading, and other bits will get through OK, with OTFS methods, because each data bit travels from the transmitter to the receiver by multiple different waveforms, all data bits, at least within a group of similarly treated data bits (often termed a data frame) will end up experiencing the same channel conditions.

To briefly summarize some aspects of these earlier disclosures, in some embodiments, data symbols intended for transmission as OTFS symbols may, on the transmitter side, be distributed, usually automatically using at least one processor and appropriate software, over various symbol matrices or "data frames". These may be N·N matrices, or even NM matrices (where M is different from N). These symbol matrices or data frames are then used as input to control the modulation of the system's wireless transmitter(s). Specifically the data symbols intended for transmission may be used to weigh or modulate a family of cyclically time shifted and cyclically frequency shifted waveforms.

This can be done by, for example, at the transmitter using the data symbols to control the operation of a bank of wireless signal modulators (e.g. QAM modulators, which may be implemented using the previously discussed methods of Harris or other methods). The resulting output can, for example, result in a plurality of bursts of QAM modulated waveforms, over a plurality of frequencies and time shifts, which can later be used by the receiver to help identify the structure of the data channel (e.g. positions and velocities of various reflectors).

Although these waveforms may then be distorted during transmission, their basic cyclic time and frequency repeating structure can be used by the system's receivers, along with appropriate receiver based deconvolution methods, to correct for these distortions by utilizing the repeating patterns to determine the type of deconvolution needed.

An important distinction between OTFS pilot symbols, and OTFS data symbols, is that the OTFS pilot symbols are typically not used to transmit any data. Rather they are used for purposes of analyzing the structure of the data channel (e.g. acquire the 2D channel state). Thus the main requirement for an OTFS pilot symbol is that the receiver be able to recognize it as being a special, non-data carrying, OTFS waveform burst that is going to be distorted by the data channel in the same way that the OTFS data carrying waveform bursts are going to be distorted. Thus the for OTFS pilot symbols complex matrix math used to encode data bits into the OTFS data symbols, and then to decode the data bits from the OTFS data symbols, is not needed.

In some embodiments, where it is desired only to characterize the 2D state of the data channel, the OTFS pilot symbols can be used without transmitting any OTFS data symbols. This 2D channel state information in turn can be used to help facilitate transmission of data according to various legacy modes, from Morse code on wires (as an extreme legacy example) to various wireless data transmission modes such as CDMA, 3G, 4G, and the like.

When used in conjunction with OTFS data symbols, there is no absolute requirement that the OTFS pilot symbols operate using the same basis OTFS waveform as the OTFS data symbols. However in a preferred embodiment, it is useful to transmit the OTFS pilot symbols and OTFS data symbols using the same OTFS waveform bursts, so that the effect of the data channel on the OTFS pilot bursts tracks the effect of the data channel on the OTFS data symbols as closely as possible.

To make it easier for the receiver to use the channel convoluted version of the OTFS pilot bursts to determine the 2D channel structure, often it will be useful to surround a given OTFS pilot burst with either null signals (e.g. neighboring regions on the transmitter OTFS time-frequency grid where no signal is transmitted), or neighboring "background" OTFS pilot-background bursts that the receiver can easily distinguish from the channel shifted versions of the OTFS pilot burst. For this reason, the null or background OTFS regions surrounding any given OTFS pilot burst can be viewed as being a special type of OTFS pilot burst in their own right. Thus the methods described herein will typically speak of transmitting a plurality of OTFS pilot bursts, but it should be understood that some of these OTFS pilot bursts may be spaces or nulls surrounding at least one, positive energy, actually transmitted, OTFS pilot burst waveform.

In a preferred embodiment, the receiver should ideally know in advance how a proper distribution of transmitted OTFS pilot bursts should be received at the receiver bins, at least in the case where there are no channel convolution effects. Assuming that this a-priori pilot information is available, then the receiver's processor can base its subsequent deconvolution calculations on the assumption that any non-ideal distribution of OTFS pilot bursts on the bins is due to channel distortion effects. This simplifies the calculations, and helps insure higher accuracy.

Method of acquiring the 2D channel state of an impaired data channel:

Again, it should be stressed that the methods described herein can apply generally across a variety of data channels, using either legacy or OTFS type data communications methods. Thus although various wireless examples and embodiments are provided here because such examples are easy to visualize, these examples and embodiments are not intended to be limiting.

Thus in some embodiments, the invention may be an automated method of acquiring a 2D channel state of an impaired data channel connecting at least one transmitter and at least one receiver. As previously discussed, and also as shown in FIG. 1, this impaired data channel will generally comprise at least one reflector. Each reflector will in turn comprise at least a reflector location (e.g. physical location in the data channel), reflector frequency shift, and at least one reflector coefficient of reflection. As will be discussed, reflectors may also have additional properties as well.

FIG. 1A shows a simplified model of a wireless data channel (100), here connecting a single transmitter (102) and a single receiver (104). Here (for simplicity) assume that the transmitter and receiver are not moving with respect to each other (although often they may also be moving as well). This data channel is impaired by the presence of one moving reflector (106) moving at a defined velocity (108). Some OTFS pilot waveform bursts (110) (112) travel directly from the transmitter to the receiver. Other OTFS pilot bursts are replica OTFS pilot bursts that have reflected off of the moving reflector (114a, 114b), and are therefore reflector time-delayed and reflector frequency shifted. The receiver thus receives a combination of the direct and replica OTFS pilot bursts as channel-convoluted OTFS pilot bursts. The order of arrival of the OTFS pilot bursts to the receiver is 1) Direct OTFS pilot burst (112) and then frequency shifted replica OTFS pilot burst (114b).

Each transmitter will generally comprise a transmitter location (e.g. physical location in the data channel) and transmitter frequency shift, and each receiver will similarly comprising a receiver location (physical location in the data channel) and receiver frequency shift. The 2D channel state will generally comprise information pertaining to the relative locations, frequency shifts, and reflector coefficients of reflection of at least some of the various transmitters, receivers, and reflectors operating in the data channel.

According to the invention's methods, the method will use this at least one transmitter, controlled by at least one transmitter processor, to transmit direct OTFS pilot (waveform) bursts. These direct OTFS pilot bursts will generally comprise a plurality of OTFS pilot symbols $P_{pt,pf}$ transmitted as OTFS pilot symbol waveform bursts $P_{pt,pf} \cdot W_p(pt, pf)$, over a plurality of combinations of times pt and frequencies pf. Here each of the pt and pf may be unique pilot time-frequency coordinates chosen from a two dimensional pilot OTFS time-frequency grid. All OTFS pilot symbol waveform bursts $P_{pt,pf} \cdot W_p(pt, pf)$ (or at least all transmitted at non-zero power levels) are mutually orthogonal waveform bursts derived from cyclically time and frequency shifted versions of a same OTFS pilot basis waveform $W_p$.

Because these OTFS pilot symbol waveform bursts are not used to transmit data, but rather are used to characterize (acquire) the 2D channel state of the data channel, there is a fair amount of flexibility possible in the choice of OTFS pilot symbol waveform bursts. However one requirement is that the plurality of OTFS pilot symbols $P_{pt,pf}$ (transmitted as OTFS pilot symbol waveform bursts $P_{pt,pf} \cdot W_p(pt, pf)$) should comprise at least one non-null OTFS pilot symbol $P_{pt,pf}$ that is transmitted as an OTFS pilot symbol waveform burst $P_{pt,pf} \cdot W_p(pt, pf)$. The power levels should be chosen so that this OTFS pilot symbol should be detectable by at least one receiver. In a preferred embodiment, the OTFS pilot symbol will also be chosen so that it can be identified by the receiver as a pilot symbol, and not be confused as being an OTFS data symbol.

In some embodiments, at least some of the plurality of OTFS pilot symbols can be null pilot symbols, which instruct the transmitter to not apply any power to the underlying $W_p(pt, pf)$ waveform (e.g. $P_{pt,pf} \cdot W_p(pt, pf)=0$). These null pilot symbols are intended to create at least some empty pt and pf unique pilot time-frequency coordinates on the two dimensional pilot OTFS time-frequency grid where no waveform burst is transmitted. These empty regions make it easier for the receiver to detect any channel convoluted OTFS pilot bursts that have been projected by the channel onto that (what should otherwise be) empty grid location.

Alternatively, in some embodiments, at least some of the plurality of OTFS pilot symbols can be transmitted as a series of uniform or standardized background pilot symbols (and associated waveforms) intended to create a uniform background of pt and pf unique pilot time-frequency coordinates chosen from the two dimensional pilot OTFS time-frequency grid. Here the transmitter will transmit the $P_{pt,pf} \cdot W_p(pt, pf)$ with power. These background pilot symbols are intended to create a standardized background to again enable projections of channel-convoluted non-null (regular) OTFS pilot bursts onto this uniform background to be detectable and quantifiable by the receiver(s).

Regardless of choice of pilot symbols and pilot symbol waveform bursts, the receiver will be configured to receive at least these pilot bursts (in some embodiments, the receiver will also receive OTFS data bursts, but this is not required) according to at least a two dimensional pilot OTFS time-frequency bin structure with bin sizes and bin-coordinate positions proportional to the OTFS time-frequency grid used for pilot and data transmission. Here the resolution of the receiver bins will typically be at least equal to, and preferably greater than, the resolution of the transmitter grid structure. The general idea is that the receiver bin structure should be chosen to be sensitive to data channel caused delays and frequency shifts, and generally a finer (smaller) receiver bin structure will be more sensitive to these effects. Note that of course the practical constraints of receiver design, and also the fact that a finer (smaller) receiver bin will in essence capture fewer photons of OTFS waveform energy on a per bin basis. Thus at some point, an extremely fine bin structure will be subject to diminishing returns due to noise limitations. Thus the receiver bins cannot be infinitely small bins in time and frequency.

Figure 1B:
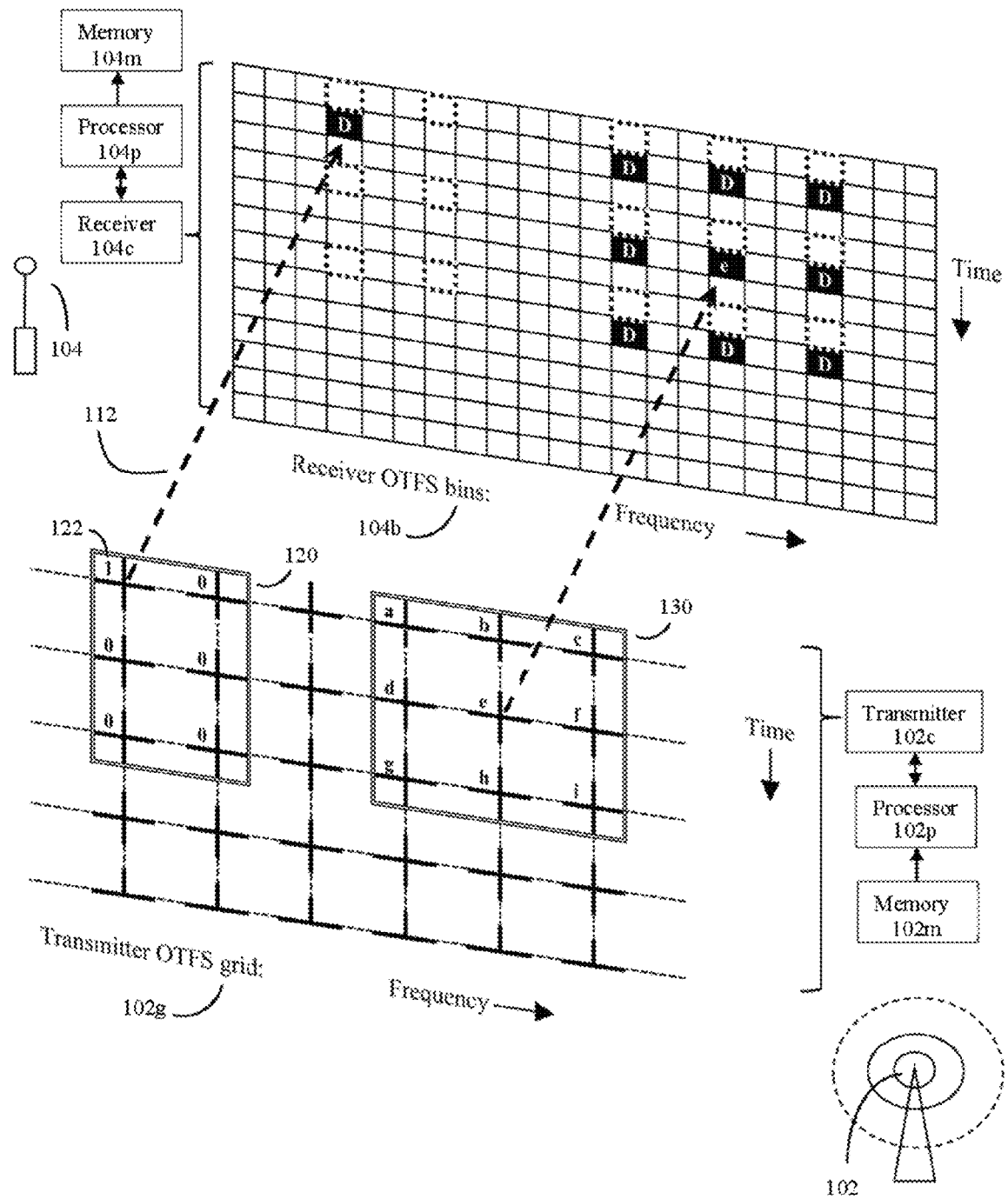
FIG. 1B shows how the invention's OTFS transmitters and OTFS receivers can use transmitter and receiver processors, along with associated memory, to transmit OTFS pilot and data symbols (using their associated OTFS waveforms, times, and frequencies) according to the transmitter's OTFS time-frequency grid, and receive OTFS symbols (using their associated OTFS waveforms, times, and frequencies) according to the receiver's corresponding OTFS time-frequency bin structure.

FIG. 1B shows how both the OTFS transmitter (102) and OTFS receivers (104) generally use transmitter and receiver processors (102$p$), (104$p$), in addition to the transmitter and receiver circuitry (102$c$), (104$c$), along with associated memory (102$m$), (104$m$), to transmit OTFS symbols (using their associated OTFS waveforms, times, and frequencies) from the transmitter OTFS grid (102$g$), and receive OTFS symbols (using their associated OTFS waveforms, times, and frequencies) into the receiver OTFS bins (104$b$).

FIG. 1B also shows how the direct OTFS pilot bursts (112) and any OTFS data bursts are received at the receiver. Here the transmitter (102) transmits various types of OTFS waveform bursts, such as various OTFS pilot symbol waveform bursts 120) and various OTFS data symbol waveform bursts (130) spaced by various time and frequencies according to transmitter OTFS grid structure (102$g$).

Here (120) represents the two dimensional pilot OTFS time-frequency grid with OTFS pilot symbol waveform bursts $P_{pt,pf}W_p$(pt, pf). With regards to optional transmission of data, (130) represents the two dimensional OTFS data time frequency grid with OTFS data symbol waveform bursts $D_{dt,df}W_d$(dt, df). Although there is no absolute requirement that the OTFS pilot symbols and OTFS data symbols be transmitted and received according to their relative positions in the same transmitter OTFS grid (102$g$) and receiver OTFS bin (104$b$) structures, often the pilot and data symbols will be transmitted and received according to the same grid and bin structure, and thus this more common option is shown here.

The transmitter transmits at least one positive energy OTFS pilot symbol burst (1) (122) (in this example surrounded by a number of empty (0) or background spacers which may have zero energy). Other options are also possible, and these will be discussed later in this specification. In this example, the transmitter is also sending a number of OTFS data symbol waveform bursts (130) at other time-frequency locations along the same transmitter OTFS grid (102$g$). Here the direct path (112) that these waveform bursts use to travel through the data channel is shown.

The receiver (102) is configured to receive the channel convoluted OTFS symbols typically according to a receiver time-frequency bin structure (104$b$) that is usually finer grained (higher resolution) than the transmitter grid (102$g$). Here using such a higher resolution receiver bin resolution (finer divisions in time and frequency) (104$b$) is generally preferred higher resolution bins help the receiver better resolve the 2D channel state of the data channel. As a rule of thumb, it is desirable to have each receiver bin be at least twice the resolution (e.g. occupy less than half of the time and frequency space) as the corresponding spacing of the transmitter OTFS grids. Often still higher bin resolutions may be desirable.

In FIG. 1B, assuming that the receiver (104) and transmitter (102) are not moving with respect to each other, the only data channel effect with regards to the direct OTFS bursts (112) is that all bursts are time delayed according to the distance between the transmitter and receiver. (In this wireless example, assume that these time delay effects speed of light related.) If the transmitter (102) and receiver (104) had been moving with respect to each other, then all bursts would have been also displaced along the receiver OTFS bin frequency axis due to Doppler effects.

In a preferred embodiment, where the transmitter (102) (specifically the transmitter processor 102$p$ and transmitter memory 102$m$) will select the OTFS pilot symbol waveform bursts (120) according to a scheme that is known by the receiver (e.g. the receiver processor 104$p$ and receiver memory 104$m$), the task of any receiver processor(s) (104$p$) and memory (104$m$) to determine the 2D channel impulse responses and the 2D channel state is greatly simplified.

Note that in the simplified example shown in FIG. 1B, the transmitter (102) has only one antenna, and the receiver (104) has only one antenna. As will be discussed later in this specification, this is not always the case.

In some embodiments, the transmitter circuitry (102$c$) may be configured to transmit multiple grids (102$g$) of OTFS symbols using multiple transmitter antennas, sometimes at different polarizations, and sometimes also adjusting the direction and/or phase of the waveforms across multiple antennas. These embodiments will also be discussed in further depth shortly.

Similarly in some embodiments, the receiver circuitry (104$c$) may be configured to receive signals using multiple receiver antennas. The receiver circuitry may also be configured (in conjunction with these multiple receiver antennas to detect the polarization, direction or phase of the incoming waveforms as well. Thus in these more complex schemes, the receiver may also be simultaneously receiving more than one bin (104$b$) of OTFS symbols at the same time as well. Note further that because, according to OTFS methods, OTFS symbols are transmitted using mutually orthogonal waveforms, in some embodiments, it may be useful to configure the receiver circuitry (104$c$) to be able to detect data channel caused projection of a first OTFS symbol transmitted using a first OTFS waveform onto a second OTFS symbol transmitted according to a second OTFS waveform because the two waveforms are mutually orthogonal to each other.

Note that in FIG. 1B, although examples of two dimensional transmitter OTFS grids (102$g$) and receiver OTFS bins (104$b$) are shown, this represents just the simplest embodiment. In other embodiments, to be discussed, the OTFS transmitter grid (102$g$) and/or the receiver OTFS bins (104$b$) can also have optional additional dimensions in addition to the time and frequency dimensions shown in the illustration. Examples of such optional additional dimensions include polarization dimensions, phase dimensions, angle of transmission or reception direction, and mixtures of the orthogonality of the received OTFS waveforms dimensions.

As can be seen in FIG. 1A, upon propagation through the impaired data channel (100), the direct OTFS pilot bursts then travel over at least one path. These paths can include direct OTFS pilot bursts traveling directly from the transmitter to the receiver (112); and replica OTFS pilot bursts. These replica OTFS pilot bursts are typically direct OTFS pilot bursts (114a, 114b) that have reflected off of at least one reflector (106) before reaching the receiver. As a result, what were originally direct OTFS waveform bursts (112) have now been further reflector time-delayed (because they have had to travel a longer distance) and also reflector frequency-shifted (assuming that the reflector may be moving) by the time these replica OTFS pilot bursts (114b) reach the receiver (104).

As a result, by the time that the direct (112) and replica (114b) OTFS pilot (waveform) bursts reach the receiver, constructive and destructive interference will occur. For example, even the direct OTFS pilot bursts (112) may be both time delayed (due to the distance between the transmitter and receiver) and also frequency shifted (because the transmitter and receiver may not be precisely accurate, or because the transmitter and receiver may be moving with respect to each other, or other effects). Thus the resulting combination of any transmitter frequency shifted and receiver frequency shifted direct OTFS pilot bursts (112), when combined with the various replica OTFS pilot (114b) bursts, will produce channel-convoluted OTFS pilot bursts.

So in essence the data channel (100) has scrambled or convoluted the original OTFS pilot bursts to an unknown extent. Here, according to the invention's methods, however, at the receiver (104), the method will use the receiver's bin structure (104b) to receive these channel-convoluted OTFS pilot bursts, and the method will use at least one processor (typically the receiver processor 104p and memory 104m) to determine (often essentially in real time) the 2D channel state of the impaired data channel (100) that connects the transmitter(s) and receiver(s).

Figure 1C:
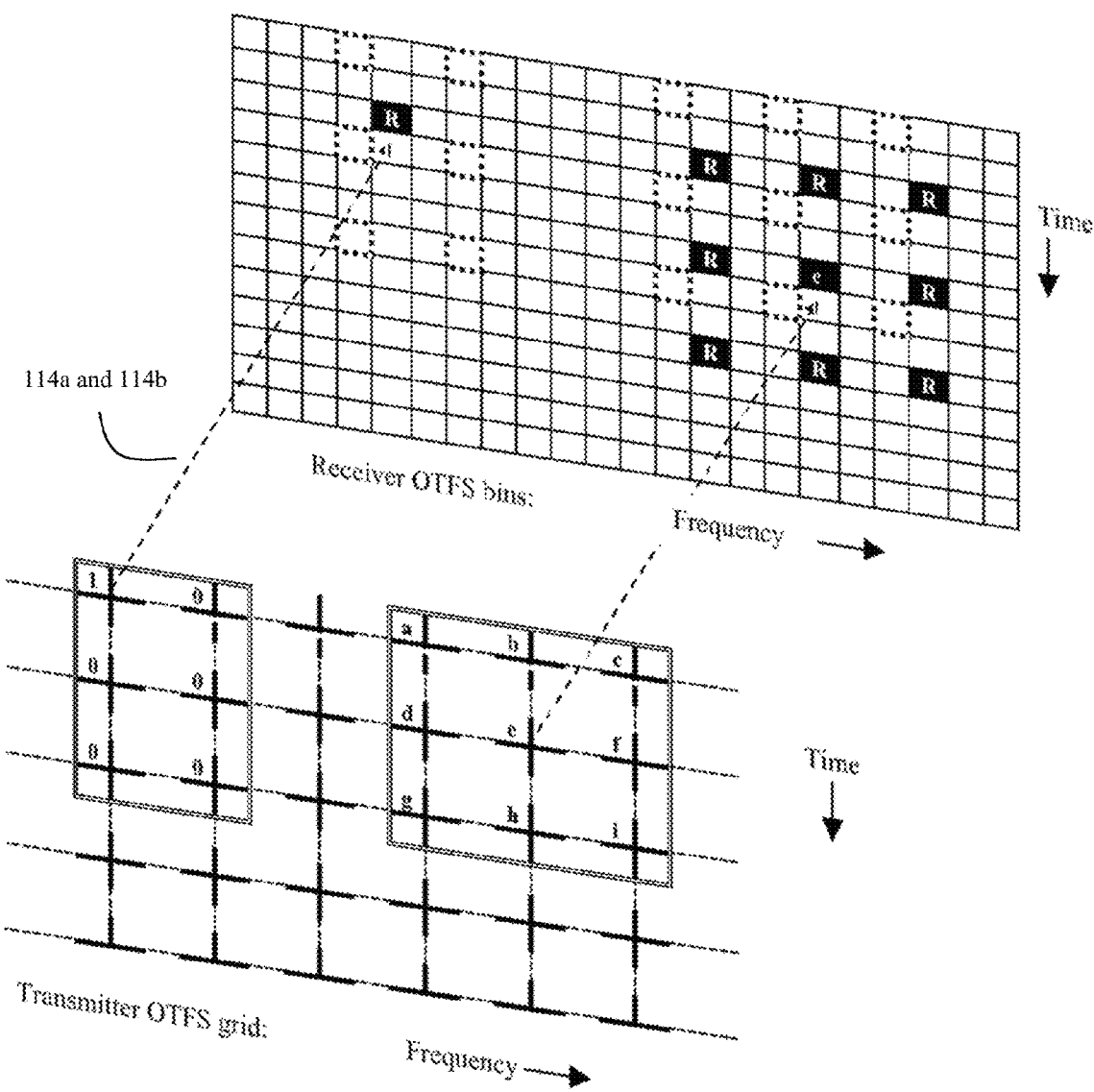
FIG. 1C shows how the replica OTFS waveform bursts (e.g. bursts that bounce off of reflectors, such as the moving reflector shown here), are received by the receiver according to the receiver bin structure. Here all OTFS waveform bursts are displaced both in time (due to the distance traveled) and frequency (due to Doppler effects).

FIG. 1C shows how the replica OTFS waveform bursts (114a), bouncing off of the reflector (106) which is moving at a certain velocity (108), are received by the receiver (104) according to the receiver's bin structure (104b). Here the OTFS waveform bursts (114b) are displaced in both time (due to the distance traveled along 114a and 114b) and frequency (due to Doppler effects due to the reflector velocity 108).

Figure 1D:
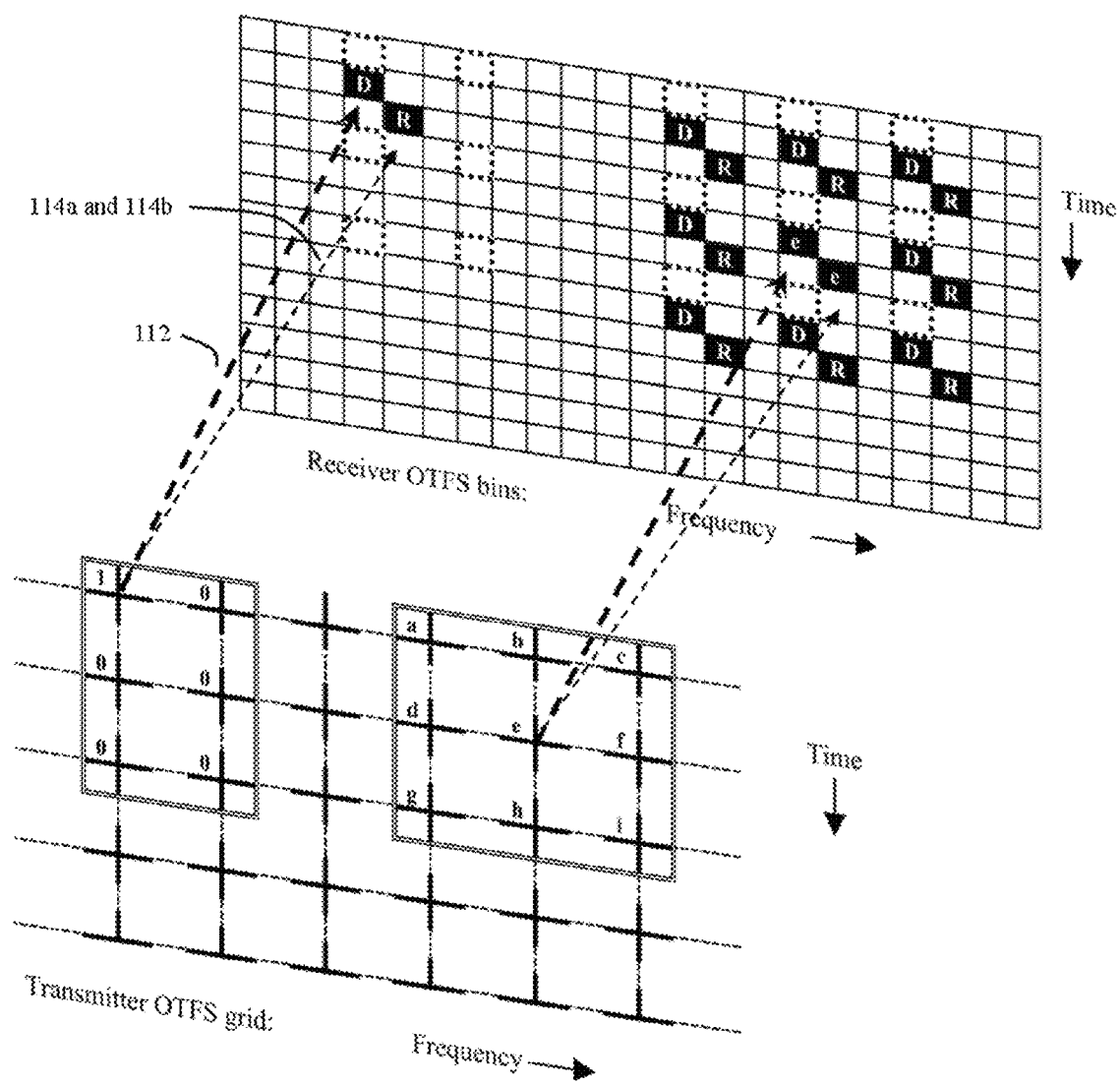
FIG. 1D shows how the channel-convoluted OTFS waveform bursts (sum of the direct bursts and the replica bursts) are received by the receiver according to the receiver bin structure.

FIG. 1D shows how the channel-convoluted OTFS waveform bursts (sum of the direct bursts 112 from FIG. 1B, and the replica bursts 114a and 114b from FIG. 1C) are received by the receiver (104) according to the receiver bin structure (104b). The receiver is now receiving a more complex mix of signals, but the same methods used to deconvolute the OTFS pilot symbol waveform bursts (120) will also work to deconvolute the OTFS data symbol waveform bursts as well (130). Note that in a real world situation, there typically will be many reflectors operating, some moving some not. Additionally there may be more than one transmitter and receiver (some moving, some not) and also, as will be discussed, the transmitters and receivers ma have multiple antennas. Thus in the real world, there will be a very complex set of channel convoluted OTFS waveform bursts at the receiver(s) (104).

In some embodiments, the 2D channel state can be represented by a matrix or other mathematical transform that describes, for the impaired data channel, how some or all signals transmitted by the transmitter are coupled with some or all signals from the transmitter that are received by the receiver.

Before going into the various details of how the processor (usually receiver processor(s) 104p) can take the raw data obtained from the receiver bin structure (104b), and transform this raw data into 2D channel state information, it is important to spend a bit more time discussing how OTFS pilot symbols (120), the transmitter OTFS time-frequency grid (102g), and the receiver OTFS time frequency bins (104b) are chosen.

In general, choice of grid structure (102b), bin structure (104b), and OTFS pilot symbols (e.g. 120, 122) should be motivated by practical considerations regarding the data channel (100), reflector spacing or positions (106) relative to the positions of the transmitter(s) and receiver(s), and expected data channel frequency shifts. The main goal is that the scheme (e.g. transmitter OTFS grid structure 102g, receiver bin structure 104b) should capture at least some of the underlying details of this expected reflector spacing and expected frequency shifts.

Thus the speeds of waveform propagation through the data channel, waveform wavelengths, and for wireless data channels, considerations such as likely speeds of the transmitters, receivers, and reflectors (which cause Doppler frequency shifts) are all valid considerations. A grid or bin structure that for example, extends too narrowly (insufficiently) in frequency or too short (insufficiently) in time to capture important details of the 2D channel structure may be suboptimum or even useless.

Similarly a grid or bin structure that is too coarse (e.g. spacing too big) so that important details of the 2D channel structure are missed (e.g. all received signals end up in one receiver bin) will again be suboptimum or even useless.

Typically the system will make these selections prior to transmission, generally according to the underlying physics of the data channel, but also according to any regulatory constraints or commercial constraints as needed. Thus regulations may place limits on allowable frequency ranges and allowable transmitter powers, for example. Commercial constraints, such as latency time considerations, may also place constraints on extent to which the grid extends in time as well.

More specifically, prior to transmission, the plurality of OTFS pilot symbols $P_{pt,pf}$ (120) transmitter two dimensional pilot OTFS time-frequency grid structure (102g), and receiver two dimensional pilot OTFS time-frequency bin structure (104b) should be chosen to usefully capture details of the data channel. This choice should be such, for example, that if, after transmission by the transmitter(s), the impaired data channel subsequently causes at least some of the OTFS pilot symbol waveform bursts $P_{t1,f1} \cdot W_p(t1, f1)$ originally transmitted at a first time-frequency (transmitter grid) coordinate to be projected onto different OTFS pilot symbol waveform bursts $P_{t2,f2} \cdot W_p(t2, f2)$ originally transmitted at a different time-frequency (transmitter grid) coordinate, these effects can be detected by the receiver. Specifically the receiver bin structure and receiver receiving circuitry should be such that when these projections occur, and OTFS pilot symbol waveform bursts are projected into different bins (e.g. bins with a time and frequency different from those nominally corresponding to the original OTFS pilot symbol waveform bursts $P_{t1,f1} \cdot W_p(t1, f1)$), at least some of these projections will be detectable and quantifiable by the receiver(s). Here, for example, standards can be set up, and/or the transmitter and receiver software (which may also be stored in memory such as 102m, 104m) designed to ensure that the grid structure and the bin structure are set up appropriately the data channel at hand.

Returning to the issue of how the processor (often the receiver processor 104p) can take the raw data obtained from the receiver bin structure (104b), and transform this raw data into 2D channel state information—here various methods may be used. Often these will be software implemented methods that may be implemented using the receiver processor(s) (104p) and associated memory (104m), but other methods, such as more specific hardware methods, may also be used.

In one scheme, the 2D channel state can be at least partially determined by using at least one 2D impulse response to mathematically describe how the impaired data channel (100) causes at least some of the OTFS pilot symbol waveform bursts $P_{t1,f1} \cdot W_p(t1, f1)$ transmitted at a first time-frequency coordinate to be projected onto either different OTFS pilot symbol waveform bursts $P_{t2,f2} \cdot W_p(t2, f2)$ originally transmitted at a different time-frequency coordinate, and/or and receiver bins (104b) different from those nominally corresponding to the OTFS pilot symbol waveform bursts $P_{t1,f1} \cdot W_p(t1, f1)$.

Here, for example, the method may further use a plurality of these 2D impulse responses from a plurality of receiver bins to at least partially describe the 2D channel state as a 2D Z-transform or other type of 2D transform. Such Z-transforms are described by Oppenheim et. al., in chapter 3 of "*Discrete-Time Signal Processing, Second Edition*, Prentice Hall, 1999, and elsewhere.

In this scheme, the 2D channel state can be viewed as a type of blurring function which in effect blurs the originally "sharp" signals transmitted by the transmitter according to individual specific coordinates on the transmitter OTFS grid (102g) and smears these signals over multiple receiver bins (104b), as is illustrated in simplified form by FIG. 1D. Here, once the smearing of a known signal (here the pilot signals) are characterized, then the same transforms used to deconvolute the pilot symbols should also work to deconvolute the data symbols as well.

Although in some embodiments, as few as one OTFS pilot symbol waveform with non-zero energy (surrounded by appropriate null or zero-energy spaces in the appropriate OTFS transmitter grid structure such as is shown in 120) may be transmitted; in other embodiments a substantial number of non-zero energy OTFS pilot symbol waveforms may be transmitted. Transmitting a plurality of non-zero energy OTFS pilot symbol waveforms can have the advantage of enabling the 2D channel state of the data channel to be established at a still higher degree of accuracy. However the costs of this later approach may be that the amount of OTFS data or legacy data (if any) transmitted at the same time may be reduced. For example, if the amount of space on the transmitter grid (102g) used to transmit OTFS pilot symbols (120) increases, then at some point the amount of space on the transmitter grid (102g) used to transmit OTFS data symbols (130) will by necessity be decreased because the transmitter grid (102g) is not of infinite size in either time or frequency. OTFS data symbols can still be transmitted in this case, but according to a subsequent data carrying grid frame, which can increase latency.

There are additional considerations as well. For example, the OTFS pilot symbols should ideally be chosen to make the subsequent determination of the 2D channel state by the receiver relatively unambiguous, and preferably also chosen to reduce the computational loads on the receiver processor(s) (104p) as well. As before, typically the plurality of OTFS pilot symbols $P_{pt,pf}$ and their OTFS grid locations will be chosen according to a common scheme understood by both the transmitter and the receiver so that the receiver processor (104p) clearly recognizes which bin locations (104b) represent channel convoluted pilot symbols.

Various schemes may be used here. In some embodiments, the plurality of OTFS pilot symbols may be one or two dimensional m-sequences (or partial m-sequences) comprising binary maximal-length shift register sequences, delta values $P_{i,j}$ surrounded by regions of $P_{pt,pf}$ zero values. Such sequences are described by Xiang, "*Using M-sequences for determining the impulse responses of LTI-systems*", Signal Processing 28 (1992), pages 139-152. Alternatively other pilot symbol schemes, such as one or two dimensional Barker codes, Costas arrays, Walsh matrixes, and the like may also be used. Here again the criteria are that this plurality of pilot symbols should be selected to facilitate acquisition (e.g. characterization) of the 2D channel state of the data channel. As before, the receiver bin structure (104b) should generally be chosen so that the various receiver OTFS time-frequency bins will have time-frequency resolutions that are equal to or more precise than the time-frequency resolutions of the OTFS transmitter grid (102g).

Transmitting Data:

Of course the 2D channel state of a data channel, in and of itself, is generally of little use unless it is then subsequently used to help facilitate data transmissions. The pilot methods described herein can produce 2D channel state information that can be useful for transmitting either legacy data (that is, data formatted according to essentially any prior-art non-OTFS methodology), or for data transmitted by OTFS methods as well.

Although in some embodiments, any data transmission can be timed to occur either before or after the 2D channel state of the data channel is determined by the methods described herein (for example, transmitting a first OTFS grid (102g) frame with nothing but data symbols, followed by either legacy data transmissions, or transmissions of a second OTFS grid frame with data symbols), in some embodiments, it will be useful to transmit data (by either legacy or OTFS methods) along with the OTFS pilot (waveform) bursts.

In this scheme, the system will generally also use the transmitter (102) and at least one processor (usually a transmitter processor 102p) to transmit a plurality of data symbols through the impaired data channel (100). This plurality of data symbols will itself typically be transmitted as direct data bursts comprising a plurality of data carrying waveform bursts. These direct data (waveform) bursts may be transmitted along with the direct OTFS pilot bursts to the receiver(s). These direct data bursts will also be reflected off the reflector(s) (e.g. 106), also producing replica data bursts. These replica data (waveform) bursts will, as before, comprise time-delayed and reflector frequency-shifted direct data bursts. When the direct and replica data bursts reach the receiver(s), constructive and destructive interference will again occur. As before, these direct data bursts may also be subject to transmitter frequency shifting or receiver frequency shifting caused by imperfections in the transmitters or receivers, motion of the transmitters and receivers, and the like). At the receiver(s), the resulting combination of any these direct data bursts (which may be transmitter frequency shifted and receiver frequency shifted), and replica data bursts will produce channel-convoluted data bursts.

If a large amount of complex and unknown data symbols were transmitted, and absent any 2D channel state information obtained from the OTFS pilot bursts, the receiver processor might encounter great difficulty in deconvoluting these channel-convoluted data bursts. However according to the methods described herein, the receiver can take advantage of this 2D channel state information, and use at least one processor (usually a receiver processor 104p and memory 104m) to deconvolute at least some of the various channel-convoluted data bursts. This allows the receiver to derive at least an approximation of the originally transmitted plurality of data symbols.

Alternatively or additionally, the receiver can also send commands back to the transmitter. (Here assume that the receiver has its own transmitter, and the transmitter in turn has its own receiver). These commands, which can be based on the 2D channel state obtained by the receiver, or indeed can be a copy of some or all of the 2D channel state obtained by the receiver, can then be used by the transmitter(s) processors (102p) and associated memory (102m) to precode at least some of the direct data bursts to pre-compensate for the impaired data channel. Thus for example, if the impaired data channel (100) induces a particular distortion, the transmitted signal can be adjusted with an anti-distortion factor such that by the time the precoded signal reaches the receiver, the anti-distortion factor cancels out the distortion caused by impaired data channel, thus resulting in a relatively clean and undistorted signal at the receiver.

Although the methods described herein can be used to help improve the efficiency of transmitting even legacy (prior art) data according to legacy methods (here Morse code on the original 1858 transatlantic cable is being used as an extreme example to emphasize this point), the 2D channel state characterization methods used herein can be most useful when used in conjunction with data that is also being transmitted by OTFS methods. These OTFS data transmission methods are further described below.

In a preferred embodiment, the direct data bursts will transmit at least some of the plurality of data symbols as direct OTFS data bursts. These direct OTFS data bursts will generally comprise a plurality of OTFS data symbols $D_{dt,df}$ transmitted as OTFS data symbol waveform bursts $D_{dt,df} \cdot W_d$ (dt, df) over a plurality of combinations of times dt and frequencies df. Here dt and df are unique data time-frequency coordinates (dt, df) chosen from a two dimensional OTFS data time-frequency grid, such as (130). Generally all of the OTFS data symbol waveform bursts $D_{dt,df} \cdot W_d$(dt,df) will comprise originally transmitted OTFS data symbols $D_{dt,df}$ transmitted by mutually orthogonal waveform bursts derived from cyclically time and frequency shifted versions of a same OTFS data basis waveform $W_d$. As per previous OTFS discussions, each data bit (and data symbol which may be formed from multiple data bits) is distributed over this plurality of OTFS data symbols $D_{dt,df}$. These OTFS data bursts travel thorough the data channel as direct OTFS data bursts and replica OTFS data bursts as described previously. At the receiver(s), they constructively and destructively combine, producing channel-convoluted data bursts. Here these are called channel-convoluted OTFS data bursts.

According to this joint OTFS pilot symbol OTFS data symbol transmission scheme, the individual data symbols in the plurality of data symbols are encoded into a plurality of OTFS data symbols $D_{dt,df}$ at the transmitter prior to transmission, often using the transmitter processor(s) (102p) and memory (102m). As per other OTFS data transmission methods, the OTFS data encoding is such that the receiver must successfully receive a plurality of OTFS data symbols $D_{dt,df}$ to provide enough information to determine any of the individual data symbols.

As per other OTFS data transmission schemes, the plurality of OTFS data symbol waveform bursts $D_{dt,df} \cdot W_d$(dt, df) are each are mutually orthogonal waveform bursts derived from a same OTFS data basis waveform $W_d$. At the receiver, the receiver bin structure (104b) is such that in addition to encompassing any OTFS pilot symbols (e.g. 120), the bin structure (104b) further encompasses the two dimensional OTFS data time-frequency grid (e.g. 130) as well. Put in yet another way, the extent of the receiver bin structure (104b) in time and frequency, and the resolution of the individual receiver bins, will at least match and preferably exceed the extent of the transmitter grid structure (102g) in time and frequency, as well as resolution.

In some embodiments, it will be useful to ensure that the OTFS pilot symbol waveform bursts and OTFS data symbol waveform bursts are transmitted and received in a highly coordinated manner. To do this, here as per FIG. 1B, the OTFS data symbol waveform bursts $D_{dt,df} \cdot W_d$(dt, df) (130) and the plurality of OTFS pilot symbol waveform bursts $P_{pt,pf} \cdot W_p$(pt, pf) (120) should be chosen from a common plurality of times t and frequencies f, where each of the t and f are unique time-frequency coordinates (t, f) chosen from a common grid of two dimensional OTFS time-frequency coordinates (102g). According to this coordinated OTFS pilot and data transmission scheme, the time-frequency coordinates (td, fd) for the individual OTFS data symbol waveform bursts should preferably be further chosen as to not overlap with the time-frequency coordinates (pt, pf) for the OTFS pilot symbol waveform bursts. Here of course, overlapping is undesirable as it can cause confusion between the OTFS pilot symbols used to determine or acquire the 2D channel state, and OTFS data symbols used to transmit data.

Note however that there is no requirement that all possible coordinates on the OTFS data time-frequency grid be filled with OTFS pilot symbols and data symbols. For example, even as shown in FIG. 1B, there can be some unused grid coordinates.

Indeed in some embodiments the OTFS data time-frequency grid may only be sparsely occupied with OTFS pilot symbols and data symbols. Thus in general, the OTFS data OTFS data symbol waveform bursts $D_{dt,df} \cdot W_d$(dt,df) and the plurality of OTFS pilot symbols $P_{pt,pf}$ transmitted as OTFS pilot symbol waveform bursts $P_{pt,pf} \cdot W_p$(pt, pf) do not need to occupy all unique time-frequency coordinates (dt, df) chosen from the two dimensional OTFS data time-frequency grid.

Note also that there is no requirement that all positive energy OTFS data symbol waveform bursts (here the "1" (122) in FIG. 1B) or pilot symbols be transmitted at the same energy or power level. Instead in some embodiments, the plurality of OTFS data symbol waveform bursts $D_{dt,df} \cdot W_d$(dt,df) and the plurality of OTFS pilot symbols $P_{pt,pf}$ transmitted as OTFS pilot symbol waveform bursts $P_{pt,pf} \cdot W_p$(pt, pf) may be transmitted at different power levels. Here, for example, some OTFS data symbol waveform bursts or some OTFS pilot symbol waveform bursts can be sent at power levels chosen according various criteria such as the 2D channel state, the distance from a given transmitter to a given receiver, sensitivity of a given receiver, and the like.

When both OTFS pilot symbols and OTFS data symbols are transmitted according to the same transmitter OTFS time and frequency grid (102g), and according to the same basis waveform (e.g. wherein the OTFS pilot basis waveform $W_p$ and the OTFS data basis waveform $W_d$ are chosen to be the same basis waveform), the topology or arrangement of which grid coordinates are used for OTFS pilot symbols, and which grid coordinates are used for OTFS data symbols, can vary. Although in FIG. 1B, the OTFS pilot symbols (120) were shown occupying a different (adjacent) portion of the transmitter OFTS grid (102g) from the OTFS data symbols (130), this need not always be the case.

In some embodiments, the grid time-frequency coordinates (td, tf) used to transmit the OTFS data symbol waveform bursts can be chosen to either surround or to be adjacent to the time-frequency coordinates (pt, pf) used to transmit the OTFS pilot symbol waveform burst. In FIGS. 1B, 1C, 1D, 2B, 2C, 3B, 3C and 4, the OTFS pilot symbols are adjacent to the OTFS data symbols. By contrast in FIG. 5, the OTFS pilot symbols are shown in a different topological configuration, where they are surrounded, at least in part, by the OTFS data symbols.

Figure 5:
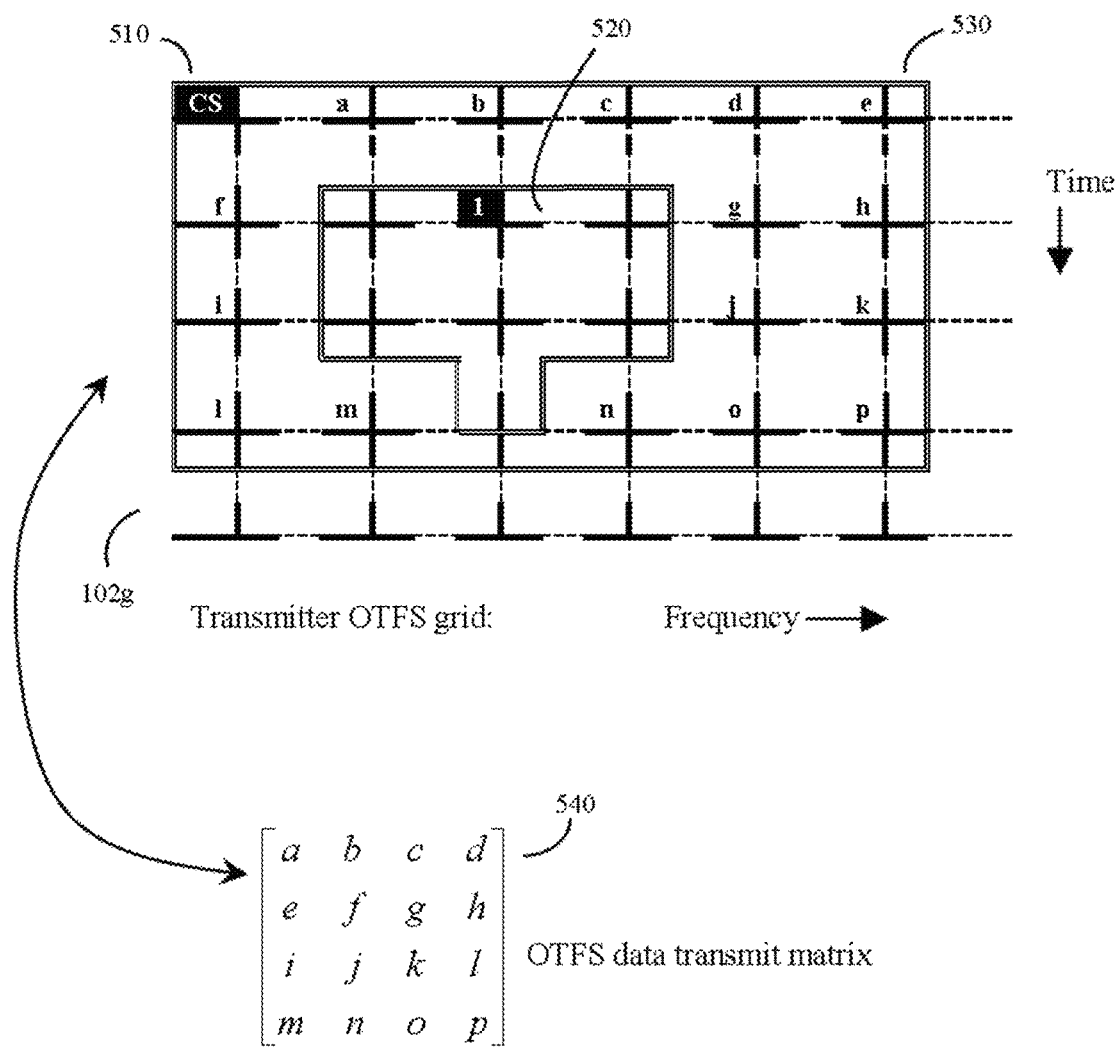
FIG. 5 shows an embodiment where the OTFS pilot symbols and OTFD data symbols are again on the same OTFS time-frequency transmitter OTFS grid, but here the OTFS pilot symbol region is embedded within the region of the grid otherwise used to transmit OTFD data symbols.

FIG. 5 shows an embodiment where the OTFS pilot symbols (here the "1" and zeros) and OTFD data symbols (here a . . . p) are again on the same OTFS time-frequency transmitter OTFS grid (102g), but where the OTFS pilot symbol region (520) is embedded within the region of the grid otherwise used to transmit OTFD data symbols (530). Note that in addition to the OTFS pilot symbols and data symbols, another OTFS symbol, such as an OTFS checksum symbol (CS) (510), is also shown.

Note that in this scheme, although the underlying N×N matrix (here 4×4) OTFS data transmit matrix (540) used as an intermediate step in the OTFS data transmission process may be a square matrix, the OTFS data symbols used in the OTFS data transmit matrix may in some embodiments be further arranged or mapped by the OTFS transmitter processor (102p) and memory (102m) into other grid locations along the transmitter OTFS grid (102g). Here, as long as the receiver (104) is aware of this mapping, the receiver can perform the inverse of this mapping after the other steps of data channel deconvolution is done, recover a replica of the original OTFS data transmit matrix, and then solve for the data bits using the previously described OTFS methods.

Note that as previously discussed, although wireless methods and wireless data channels are used as specific examples, these OTFS pilot methods may be applied to a variety of different types of data channels. These data channels can include data channels (impaired data channels) such as optical fiber data channels comprising at least one optical fiber (here the waveforms will typically be optical or infrared waveforms), electrically conducting wire data channels comprising at least one metallic electrical conductor (here the waveforms will be electrical impulses or RF waveforms), or even data channels comprising a fluid such as water (here the waveforms may be acoustic waveforms).

Wireless Embodiments

Going forward, the discussion here will more specifically focus on wireless data transmission methods.

In these wireless embodiments, the impaired data channel is a wireless data channel, the transmitter(s) and receivers are wireless transmitter(s) and receivers capable of movement (velocity) in space, and hence are subject to Doppler frequency shifts. That is, each transmitter has a transmitter velocity, and that transmitter's frequency is at least partially determined by a transmitter Doppler shift that varies according to this transmitter velocity. Similarly each receiver has a receiver velocity, and this receiver frequency is at least partially determined by a receiver Doppler shift that varies according to that receiver velocity.

In the wireless embodiment, the reflector(s) (106) reflect wireless signals (waveforms) and are also capable of movement in space (velocity) (108). Thus here, the reflector frequency shift(s) are receiver velocity Doppler shift(s). The various reflectors can be further characterized by various parameters. Thus here, for example, the at least one reflector coefficient of reflection is a reflector coefficient of wireless reflection.

Thus in the wireless embodiment, the direct OTFS pilot bursts comprise a plurality of wireless OTFS pilot symbol waveform bursts. In the wireless embodiment, the 2D channel state comprises information pertaining to relative locations, velocities, velocity induced frequency shifts caused by transmitter Doppler shifts, receiver Doppler shifts, reflector Doppler shifts, and reflector coefficients of reflection of the various transmitters, receivers, and reflectors.

Despite these changes, the previous techniques, methods, and systems of characterizing the data channel and determining the 2D channel state still apply. However the wireless embodiments also enable further refinements to the previously discussed techniques as well.

With regards to wireless transmission of data, the previously described OTFS pilot burst techniques and 2D channel state acquisition techniques can be useful for helping to improve wireless data sent by either legacy (e.g. prior art) methods, as well as useful for helping to improve wireless data sent by more advanced OTFS data transmission methods, which will be described shortly.

Thus for example, the methods described herein can be used by at least one wireless transmitter, and at least one processor (often 102p and 104p) to also (in addition to OTFS pilot bursts) transmit a plurality of data symbols through the impaired data channel to at least one receiver.

Here the transmitter(s) (e.g. 102) will transmit at least some of the plurality of data symbols as direct data bursts. These direct data bursts comprise wireless data carrying waveform bursts. Here the data symbols and wireless data carrying waveform bursts can be transmitted by various legacy (prior art) and non-legacy (e.g. OTFS) schemes, including Time division multiple access (TDMA), Global system for mobile communications (GSM), Frequency division multiple access (FDMA), Orthogonal frequency-division multiplexing (OFDM), Code division multiple access (CDMA), OTFS wireless waveform bursts, or other types of wireless waveform bursts. Thus unless otherwise specified use of OTFS wireless waveform bursts for data communications is not intended to be limiting for many of the claims.

As generally described previously in this disclosure, just as per the OTFS pilot bursts, the direct data bursts are also reflected off of the various wireless reflectors (e.g. 106), thereby producing replica data bursts comprising direct data bursts that are further reflector time-delayed and reflector velocity Doppler-shifted at the at least one wireless receiver (104). As before, at the various wireless receivers, the resulting combination of any transmitter Doppler-shifted and receiver Doppler-shifted direct data bursts, and replica data bursts, produce channel-convoluted data bursts.

Again as previously described, the invention's methods can use the 2D channel state and at least one processor (often at least a receiver processor 104p and associated memory 104m), to deconvolute at least some of the channel-convoluted data bursts at the wireless receiver(s), thereby deriving at least an approximation of the originally transmitted plurality of data symbols. Alternatively or additionally, the receiver(s) can also transmit 2D channel state derived commands, or other information pertaining to the 2D channel state, back to the transmitter. The transmitter, often using at least one transmitter processor (102p) and associated memory (102m), can then optionally use these commands to precode at least some of the direct data bursts to pre-compensate for the effects of the impaired data channel.

In contrast to OTFS methods, which typically spread every data bit over a two dimensional time and frequency axis, many legacy wireless waveforms operate by spreading data over only a one-dimensional axis (e.g. only spread by time, only spread by frequency).

The 2D channel state information encompasses both types (time-frequency) of signal spreading, but tends to simultaneously report on how the impaired data channel spreads signals over both time and frequency at the same time. Thus, in some embodiments, if it is desired to transmit data according to a non-OTFS legacy or prior art format, it may be useful to further simplify the 2D channel state information to enable it to be more readily applied to help improve the transmission of such legacy wireless waveforms.

Such simplification can be done by, for example, using a 1D (one dimensional) projection of the 2D channel state information along any of a time axis, frequency axis, or time-frequency axis. This projection help convert the more sophisticated 2D channel state information into a simpler form that can then be applied to help either deconvolute or precode legacy wireless waveform transmitted data.

Polarization Methods

In some embodiments, it can be useful to further use polarized OTFS pilot (wireless waveform) bursts to further characterize the data channel impairments, and produce even more accurate 2D channel state information. These methods take advantage of the fact that different types of reflectors interact with polarized wireless waveforms in different ways. These differences can be exploited to help the system better distinguish between the various types of reflectors that are present in the data channel. Polarization methods are shown in more detail in FIGS. 2A through 2C.

Here for example, at least one wireless transmitter (202) can be configured to transmit polarized wireless waveforms, for example using polarized antennas according to two polarization directions, such as horizontally (202$h$) and vertically (202$v$). This transmitter (202) transmits direct OTFS pilot bursts as polarized direct OTFS pilot bursts (212$h$) and (212$v$). These direct OTFS pilot bursts comprise polarized wireless OTFS pilot symbol waveform bursts that have been polarized according to at least one polarization direction (here two different directions are shown). Here we will use linear polarization as a specific example, but this example is not intended to be limiting, and other types of polarization (e.g. circular polarization, etc.) may also be used. Further assume that going forward the various transmitters and receivers being discussed all have their own circuitry, processors, and memory as previously discussed in FIG. 1B.

In this example, assume that at least one of the various wireless reflector(s) in the data channel are polarization altering wireless reflectors that alter the polarization direction of its reflected wireless OTFS waveform bursts according to a first reflector polarization operator (e.g. polarization rotation angle, filter, tensor, etc.). As a result, such reflectors produce replica polarized OTFS pilot bursts that comprise polarization shifted time-delayed and reflector Doppler-shifted replicas of the original polarized direct OTFS pilot bursts. Here, the wireless receiver(s) (204) should themselves be further configured (usually with polarized antennas and suitable receiver circuitry) to be able to detect a direction of polarization in the received wireless waveforms. This can be done by using receiver antennas (usually a plurality of receiver antennas) configured to detect different directions of polarization.

FIG. 2A shows how polarized OTFS pilot symbol waveform bursts can be used to further distinguish between different types of reflectors in the impaired data channel. Here there are two reflectors (206), (208). In this admittedly contrived example, reflector (206) is positioned to be more distant from the transmitter (202) and receiver (204). Further assume here that reflector (206) is a stationary reflector that only reflects vertically polarized waveforms.

In this example, assume that reflector (208) is positioned closer to the transmitter (202) and (204), and that reflector (208) is also moving rapidly closer with respect to both with velocity "v" (209). Assume further that reflector (208) shifts the direction of polarization for all reflected polarized waveforms by 45 degrees.

The receiver and transmitter each have a horizontal and vertical antenna (202$h$, 204$v$, 204$h$, 204$v$). The transmitter can be further configured to transmit two different (but time and frequency synchronized) streams of data, one stream for each antenna, according to two different time and frequency synchronized OTFS transmitter grids (202$gh$, 202$gv$). The receiver can be further configured to receive (synchronized by time and frequency) data according to each receiver antenna polarization direction into two different time and frequency synchronized receiver bin structures (204$bh$, 204$bv$).

Thus, even in this simplified example, we end up with a complicated mix of direct bursts (212$h$), (212$v$), and replica bursts. These replica bursts include (214$ha$) and (214$va$) hitting reflector (206), which absorbs all of (214$va$) and only reflects (214$hb$) to the receiver (204), where only vertical polarized receiver antenna (204$h$) can detect it. The replica bursts also include (216$ha$) and (216$va$) which travel to moving reflector (208). There, the moving reflector alters the direction of both bursts by 45 degrees, and also imparts a Doppler shift to both bursts, and thus each polarized receiver antenna (204$h$) and (204$b$) detects both frequency shifted and polarization shifted waveform bursts as a mixture of (216$vb$) and (216$hb$).

Due to the relative position of reflectors (206) and (208) in this example, assume that the time of arrival of the various bursts at the receiver (204) is as follows. Because reflector (208) does not impart much additional distance to the signals, direct signals (212$h$) and (212$v$) and replica signals (216$vb$) (216$hb$) arrive at both antennas (204$h$) and (204$b$) at about the same time. However because of the longer distance traveled, signal (214$hb$) arrives at receiver (214$h$) at a later time.

Absent the invention's 2D channel state information, if the transmitter transmitted such different data streams, using the same time and frequency slots, and same basic set of OTFS waveforms, the receiver would have profound difficulties in distinguishing the two streams. However as will be discussed, due to polarization differences, by using the invention's 2D channel state information obtained from the OTFS pilot symbol waveforms, the receiver will be able distinguish between the two data streams.

At the wireless receiver(s), the resulting combination of any transmitter Doppler-shifted, receiver Doppler-shifted, and receiver polarized direct OTFS pilot bursts and replica polarized OTFS pilot bursts produce channel-convoluted polarized OTFS pilot bursts. The receiver(s) can then receive these channel-convoluted polarized OTFS pilot bursts and detect their direction of polarization. The direction of polarization of these channel-convoluted polarized OTFS pilot bursts can then be used (often by one or more receiver processors) to further determine the 2D channel state of the impaired data channel.

Figure 2B:
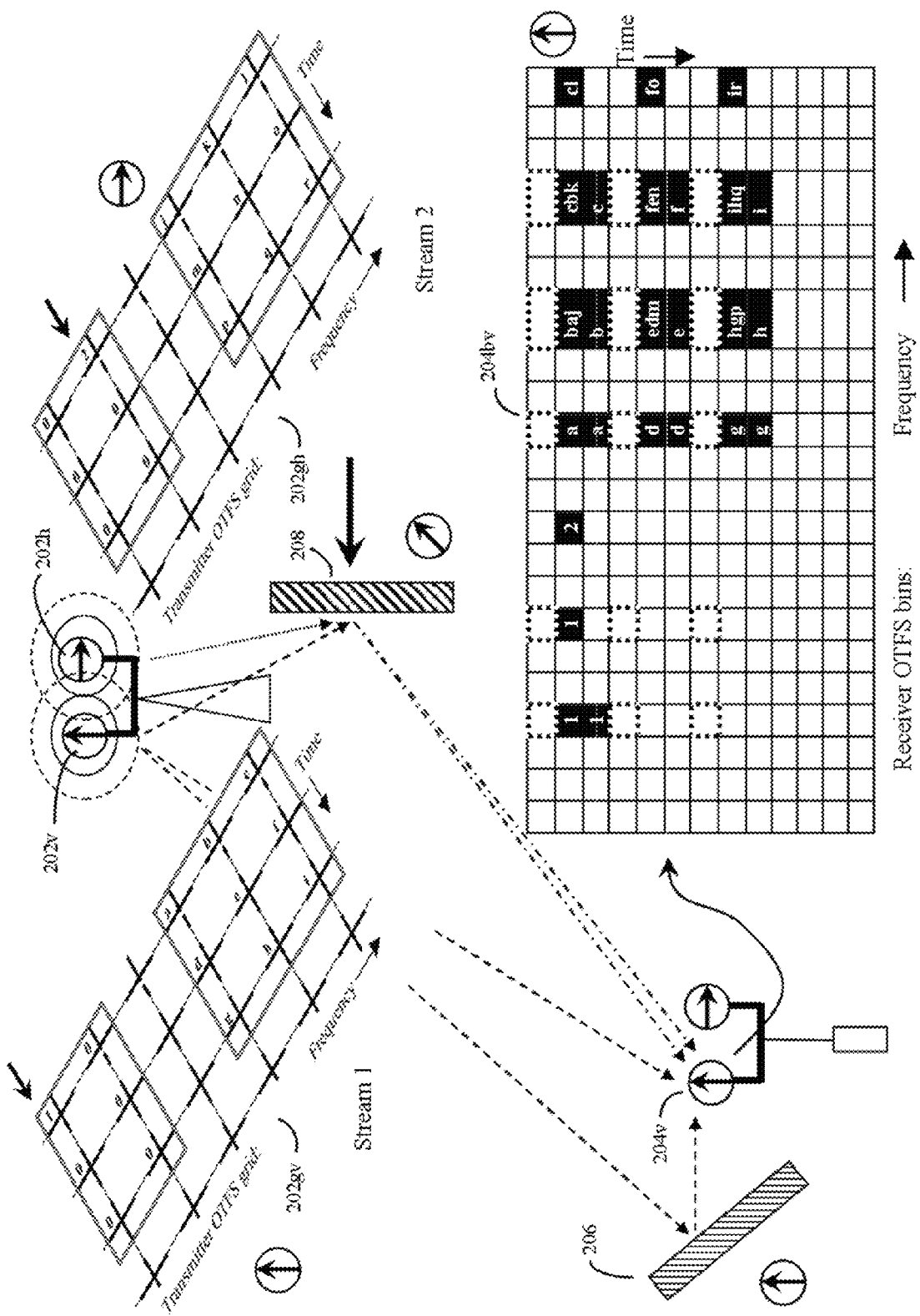
FIG. 2B shows how the transmitter from FIG. 2A can transmit different time, frequency, and OTFS waveform synchronized streams of data from its polarized horizontal and vertical antennas.

FIG. 2B shows more details of the underlying transmitter grid structure and receiver bin structure regarding how the transmitter from FIG. 2A can transmit different but time, frequency, and OTFS waveform synchronized, streams of data from its horizontal and vertical antennas (202$h$) and (202$v$). Here assume that the transmitter's processor and memory have stored two different OTFS grids (202$gh$, and 202$gv$) for transmission. Here the transmitter's vertical polarized antenna (202$h$) is transmitting pilot symbol "1" and OTFS data symbols "a, b, c, d, e, f, g, h, I" as various OTFS symbol waveform bursts according to the time and frequency spacing shown in the OTFS transmitter grid (202gv). The transmitter is also, at the exactly the same time, and exactly according to the same time and frequency spacing, using OTFS transmitter grid (202gh) to transmit pilot symbol "2" (time and frequency offset from pilot symbol 1) and OTFS data symbols "j, k, l, m, n, o, p, q, r" on the horizontal polarized antenna (204h).

The various reflectors (206) (208) act on the various transmitted signal bursts as previously described in FIG. 2A. For illustrative purposes, the various time delays and frequency shifts are show producing a relatively large shift in the corresponding signal bursts as they are received according to the receiver's bin structure. The receiver receives the channel convoluted OTFS waveform bursts on its polarized antennas (204v) and (204h). Here the receiver reception on the receiver's vertical polarized antenna (204v) according to the receiver's vertical polarized OTFS time-frequency bin structure (204bv) is shown. Note how the 2D channel state has mixed the two streams up with each other, but that the pilot symbol mixing pattern remains relatively easy for the receiver processor(s) to analyze.

In this diagram, to show that in some cases, the data channel may project the frequencies or times of an originally transmitted OTFS signal burst relatively far into the frequencies or times normally reserved for an adjacent OTFS signal burst (according to the transmitter's grid structure) in some of the cases, multiple transmitted signals are shown occupying the same receiver time-frequency bin. Note that the size of the receiver bins in time and frequency typically will all be of constant size, but for these illustrations, in order to show multiple signals showing up on the same bin, the bin size had drawn larger to show all of the different signals and symbols.

Note also that at least when the data channel impairments cause a given OTFS symbol to be projected on top of the time and frequency range simultaneously occupied by another OTFS symbol, as long as the underlying OTFS waveforms used to transmit the different OTFS symbols remain mutually orthogonal, then with the proper circuitry, the receiver can distinguish this mix and determine the different underlying OTFS symbols.

FIG. 2C is very similar to FIG. 2B, except that here the events happening on the receiver's reception on the receiver's horizontal receiver OTFS time-frequency bin (204bh) structure is shown.

MIMO Methods

In some embodiments, it can be useful to further use multiple spatially separated transmitting and receiving antennas to further characterize the data channel impairments. Like polarization, but in a different way, MIMO methods also help both to produce more accurate 2D channel state information, as well (as will be discussed) to help introduce another dimension of spatial separation to the data channel, which can be exploited to further increase the amount of data carried by the data channel. MIMO methods are shown in more detail in FIGS. 3A through 3C. Note that these MIMO methods may be combined with the previously discussed polarization methods to produce even higher levels of 2D channel state accuracy and overall system performance.

Before going further into MIMO discussions, it is useful to first expand on the concept of a "data stream". Here an analogy to serial and parallel data transmission may be useful. It is known that data can be transmitted between transmitters and receivers according to serial and parallel data transmission schemes. Using wires as an analogy, when all data bits travel over the same wire, this is generally understood to be serial communications. When different data bits are partitioned to travel over different wires, this is generally understood to be parallel communications.

Similarly in a wireless embodiment, although at first glance it might look as if the space over which wireless waveforms travel might be only one data channel, if the wireless waveforms are separated by different frequencies, or modulated by different (orthogonal to one another) waveforms, then a wireless analogy to parallel communications can also result. As another example, if wireless communications are done between different sets of highly directional transmitter and receiver antennas, with minimal cross-talk between different sets of directional transmitter and receiver antennas, then each transmitter and receiver antenna set can be viewed as forming its own unique communications channel, and again parallel channels of communications can be achieved.

The distinction between serial and parallel starts to become blurred when multiple channels of wireless communication are transmitted at the same time, same frequency, same underlying waveform, and using less direction specific (e.g. omnidirectional type antennas). However even here, just as at a cocktail party, human listener can, at least in some conditions, listen to various simultaneous conversations at the same time and use two ears, sound echoes, and other types of audio channel communication impairments to in effect "tune in" to different conversations at the same time.

As a simplified analogy, the invention's 2D channel state acquisition methods can also make use of clues obtained from various types of data channel impairments to distinguish between different simultaneous "streams" of information.

How many different "streams" of information a data channel can support can be viewed as varying according to the underlying data channel structure or impairments (e.g. distribution of reflectors) of the data channel. Consider a case where the distribution of reflectors in a data channel is such as to effectively create an isolated conduit between each different transmitting antenna and each different receiving antenna. Such a data channel and 2D channel state could thus support a large number of different streams of data in, limited mainly by the number of transmitting and receiving antennas.

By contrast, in a case where the data channel has no reflectors, and all of the transmitting and receiving antennas are omni-directional, then at least with regards to transmitting different data symbols at the same time, frequency, and underlying waveforms, problems caused by intersymbol-interference (isi) would greatly reduce the number of different streams that could be transmitted at the same time.

As previously discussed, the 2D channel state information can, in some embodiments, be represented by matrices, and with regards to different streams of information or data, the question of how many different streams can be simultaneously transmitted by a given data channel can be viewed (in linear algebra terms) somewhat in terms of the "rank" of the 2D channel state matrix in this case. This rank is the size of the collection of linearly independent rows (or columns, since column rank is equal to row rank) of the matrix. In some embodiments, this can also be viewed as the number of solutions of the system of linear equations that represent the effect of the impaired data channel on data transmission.

The 2D channel state matrix can also be viewed as a scheme that expresses how waveforms input into the data channel by the transmitter are mutated by the data channel, and show up in the end as output waveforms detected by the receiver. In effect, to successfully transmit different streams of data, not only must different streams of data be originally transmitted by the transmitter, but also at the end, the receiver needs to be able to successfully separate (distinguish between) the different input streams of data as well.

Given this insight, the methods described herein thus teach that using techniques to improve the "rank" of the 2D channel state matrix, such as by using polarization and MIMO, to thus create higher rank 2D channel state matrixes and "richer" data channels. These in turn allow wireless systems to operate at increasingly higher levels of performance (e.g. higher data transmission rates, lower energy per symbol, increased resistance to fading, and the like). In some embodiments, improvement of an order of magnitude and more over prior art methods may be achieved according to these schemes.

Put in simpler terms, the methods describe herein allow the communications system to quickly characterize the channel state of the wireless data channel, and determine if, for example, at any given moment there is a fortunate combination of reflectors that can enable the data channel to send more streams of data than might otherwise be the case. If so the invention's automated methods can take advantage of this fortunate combination of reflectors (some may be moving, some may be stationary), and at least temporarily boost the number of streams of data sent to take advantage of this fortunate and possibly very transient situation. The invention's automated methods also allow the system, given a deep understanding of this possibly temporary combination of reflectors, to understand how to decode these multiple streams of data. By contrast, prior art methods, which are not configured to take advantage of fortunate and possibly temporary chance arrangement of reflectors, operate comparatively inefficiently, relative to what the inventions' methods show are now possible.

Note that although going forward this disclosure will thus focus on the invention's particularly novel stream techniques, where signals are sent at the same times, frequencies, and underlying waveform types, this teaching by no means disclaims other and more standard methods of achieving parallelism, such as by transmitting at different times, different frequencies, and different underlying waveform types. Thus standard methods of achieving parallel methods of data transmission may also be used in conjunction with the multiple stream methods disclosed herein.

Thus in some embodiments, particularly with regards to MIMO techniques, in addition to 2D channel state characterization, the system will also transmit direct data bursts as direct OTFS data bursts comprising OTFS data symbols transmitted by OTFS wireless data symbol waveform bursts. Here in this MIMO configuration, on a per transmitter-receiver basis, the wireless transmitter may have T uniquely configured transmitting antennas, and the wireless receiver may R uniquely configured receiving antennas. Because this is MIMO, both T and R will be greater than 1, and R (the number of receiver antennas) may often be greater than or equal to T.

Here the wireless transmitter will be configured to use its T transmitting antennas to simultaneously transmit, over a same frequency range, at most T streams of stream identifiable direct OTFS data and pilot bursts. Here each stream identifiable direct OTFS data and pilot bursts will preferably have at least their various OTFS pilot symbols $P_{s,pt,pf}$ further chosen to be stream identifiable. In the examples shown in FIGS. 3A-3C, for example, the first stream has a first OTFS pilot burst occupying a first OTFS transmitter OTFS grid location, while the second stream has a second OTFS pilot burst occupying a second OTFS transmitter OTFS grid location. As will be seen, these differences help the receiver determine the 2D channel state for each stream, and also help deconvolute or correct for distortions caused by the impaired data channel.

FIG. 3A shows how the system may also use spatially separated transmitting and receiving antennas (302a1, 302a2) and various OTFS pilot symbol waveform bursts to both further characterize the 2D channel state of the data channel, and for other purposes as well. These other purposes can include imparting a spatial directionality to the transmitted or receiving wireless waveforms, and also successfully transmitting and receiving more streams of data at the same time, frequency, and OTFS wireless waveforms then would normally be possible if the data channel had no impairments.

In particular, FIG. 3A shows a simplified MIMO situation where the MIMO transmitter (302) has two spatially separated antennas, the MIMO receiver (304) has two spatially separated antennas (304a1, 304a2), and there is one stationary reflector in the data channel (306), here shown positioned closer to the left hand side of the transmitting and receiving antennas than it is to the right hand side of the antennas.

Here, assume that the order of arrival of the various OTFS pilot bursts (and any data bursts as well) to the various receiving antennas is, with respect to receiving antenna 304a1, first direct (312a1), then direct (313a2), then replica (reflected) (314a1 to 314ba1), and finally replica (reflected (314a2 to 314ba2). The different orders of arrival can show up as different arrival times on the receiver bin structure (drawn this way in FIGS. 3B and 3C because this is easier to show), or also as different waveform phases or different angles of arrival on a higher dimensional representation of the receiver bin structure (not shown).

The order of arrival of the various OTFS pilot bursts is, with respect to receiving antenna (304a2), first (312a2), then (313a1), then (with a greater delay) replica (reflected (314a1 to 315ba1), and last (due to the longer distance) replica (reflected) (314a2 to 315ba2). Again the different orders of arrival can show up as different arrival times on the receiver bin structure (drawn this way in FIGS. 3B and 3C here because this is easier to show), or also as different waveform phases or different angles of arrival on a higher dimensional representation of the receiver bin structure (not shown).

Figure 3B:
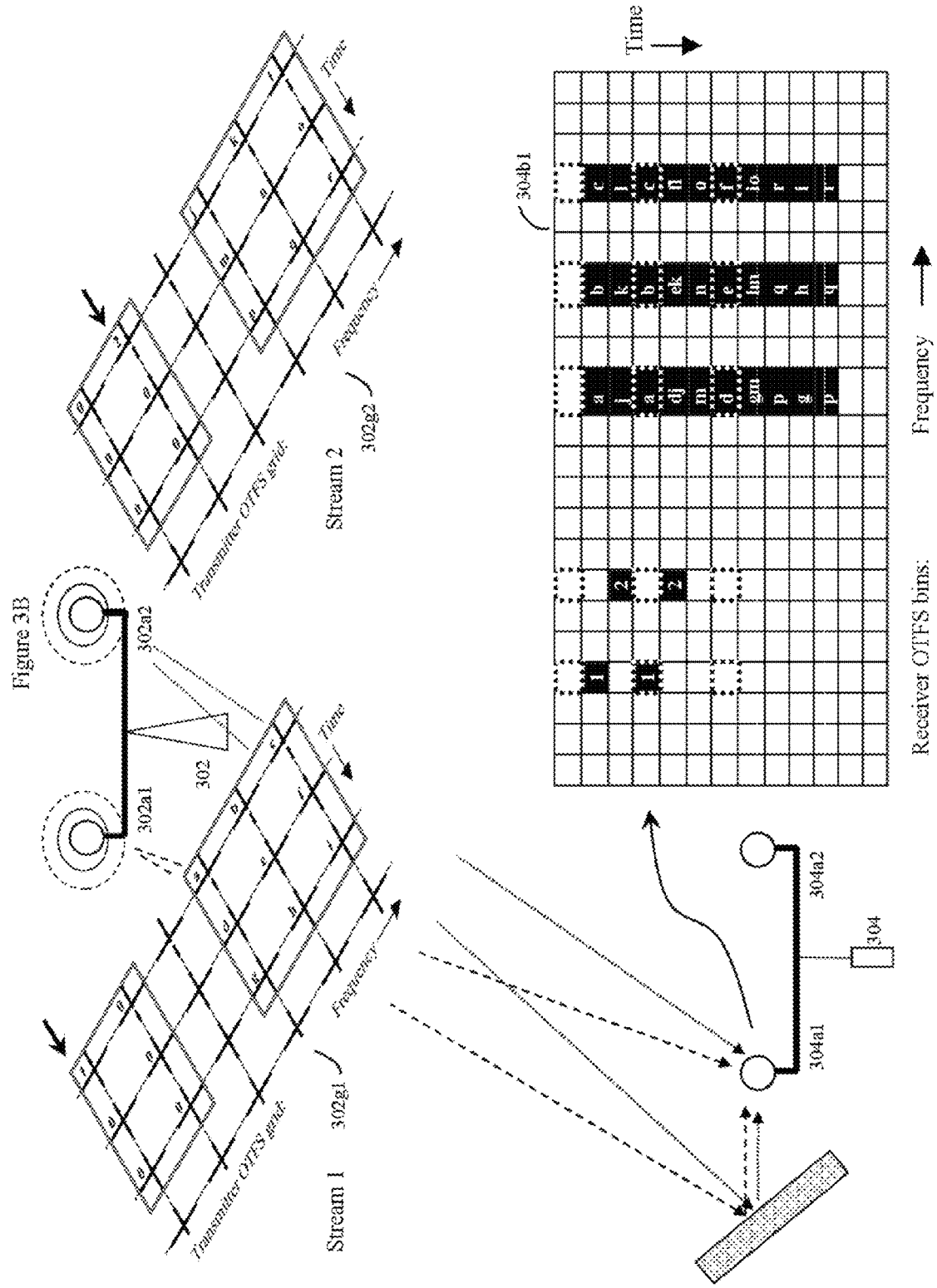
FIG. 3B shows how the MIMO transmitter from FIG. 3A can transmit different, but time, frequency, and OTFS waveform synchronized, streams of data from its spatially separated right and left antennas, and how these are received by one of the MIMO receiver's spatially separated antennas and corresponding bin arrangement.

FIG. 3B shows how the MIMO transmitter from FIG. 3A can transmit different but time, frequency, and OTFS waveform synchronized, streams of data as different transmitter grids (302g1) (302g2 from its two antennas (302a1 and 302a2). Here the MIMO transmitter's left antenna (302a1) is transmitting pilot symbol "1" and OTFS data symbols "a, b, c, d, e, f, g, h, I" as various OTFS symbol waveform bursts according to the time and frequency spacing shown in the OTFS transmitter grid (302g1). The MIMO transmitter is also, at the exactly the same time, and exactly according to the same time and frequency spacing, transmitting pilot symbol "2" (time and frequency offset from pilot symbol 1) and OTFS data symbols "j, k, l, m, n, o, p, q, r" on its left antenna (302a2) according to grid (302g2). The reflector (306) acts on these signals as previously discussed in FIG. 3A. As previously discussed, due to the spatial arrangement of the various antennas, the OTFS waveforms do not all arrive simultaneously and at the same angle, but rather arrive at different times (and different waveform phases, which also vary as a function of time) and different angles.

To simplify the drawing, assume that the MIMO receiver antennas (304a1) and (304a2) are receiving and detecting the slightly different travel times for the various transmitter antenna, reflector, and receiver antenna configuration as different delay times on the receiver OTFS time-frequency bin structure. In actuality, the MIMO receiver may often instead detect these differences as differences in the phase angles of the various waveforms, or even as different directions of arrival of the various waveforms, and handle this using receiver bins with additional dimensions, but it is easier to show these differences as time differences to illustrate the concept.

The MIMO receiver (304) receives the channel convoluted OTFS waveform bursts on its antennas. Here the MIMO receiver reception on the MIMO receiver's left antenna (304a1) OTFS time-frequency bin structure (304b1) is shown. Note how the 2D channel state has mixed the two streams up with each other, but that the pilot symbol mixing pattern remains relatively easy for the receiver processor to analyze.

FIG. 3C is essentially a repeat of FIG. 3B, except that here the signals received by the MIMO receiver's right hand antenna (304a2) according to this antenna's OTFS time-frequency bin structure (304b2) are shown.

As before, at the at least one wireless receiver antenna $R_a$, a resulting combination of the transmitter Doppler-shifted and receiver Doppler-shifted stream identifiable direct OTFS data and pilot bursts, and replica stream identifiable direct OTFS data and pilot bursts, produce receiving antenna specific channel-convoluted stream identifiable OTFS data and pilot bursts.

According to the invention's techniques, the T transmitting antennas and R receiving antennas should be configured so that the R receiving antennas receive different receiving antenna specific channel-convoluted stream identifiable OTFS data and pilot bursts with detectably different 2D channel states. This can be done by various methods, including a sufficiently large separation between the antennas, to impart an ability for the receiving antennas to sense the directionality of the incoming wireless waveforms, and/or configuring the receiver so that it further keeps track of the relative phases of the incoming wireless waveforms. Here such phase detection methods can be particularly useful.

According to the invention's methods, the efficiency or chances of successfully transmitting the (at most) T streams of data to the wireless receiver using the receiver's R receiving antennas to receive the antenna specific channel-convoluted stream identifiable OTFS data and pilot bursts. Then, for each wireless receiving antenna R and each stream identifiable plurality of OTFS pilot symbol waveforms, using a processor (typically a receiver processor) to determine the 2D channel state at that that receiving antenna, thereby determining various stream specific 2D channel states. These stream specific 2D channel states (e.g. the information in the stream specific 2D channel states) can then, for example be used (often by the receiver processor) to deconvolute at least some of the antenna specific channel-convoluted stream identifiable OTFS data and pilot bursts at the receiver. This allows the receiver to therefore determine least an approximation of the originally sent, stream identifiable, data symbols.

Alternatively or additionally, as before, commands derived from this 2D channel state information, or some or all of the 2D channel state information itself, can be sent to the transmitter. There, the transmitter processor can use these commands or 2D channel state information to precode at least some of this stream identifiable direct OTFS data and pilot bursts to again pre-compensate for the impaired data channel (or put alternatively, better exploit fortuitous reflector arrangements in the impaired data channel for higher advantage).

More specifically, for situations such as this MIMO example, determining or acquiring the 2D channel state in this situation can be done by using at least one 2D impulse response to mathematically describe how the data channel impairments cause various streams to be projected onto each other. For example (using a two stream example of stream identifiable direct OTFS data and pilot bursts) assume that stream-1 OTFS pilot symbol waveform bursts $P_{s1,t1,f1} \cdot Wp(t1,f1)$ transmitted at a first time-frequency coordinate are projected by the data channel onto different stream-2 OTFS pilot symbol waveform bursts $P_{s2,t2,f2} \cdot Wp(t2,f2)$ originally transmitted at a different time-frequency coordinate. The receiver detects this projection because the projected OTFS pilot symbol waveform end up being received into receiver bins that are different from those normally corresponding to the stream-1 OTFS pilot symbol waveform bursts $P_{s1,t1,f1} \cdot Wp(t1,f1)$. This projection and resulting arrival into different receiver bins will vary according to a receiving antenna specific aspect of the impaired data channel. Thus (if properly configured) the receiver will determine, for each different stream, R receiving antenna specific 2D impulse responses. The receiver (often using the receiver processor) can then use, for each different stream, these R receiving antenna specific 2D impulse responses to deconvolute the receiving antenna specific channel-convoluted stream identifiable OTFS data and pilot bursts. Alternatively or additionally, the receiver can transmit commands based on these R-receiving antenna specific 2D impulse responses, or some or all of the 2D impulse response data, to the transmitter and the transmitter can then use this information to further precode subsequent transmitted streams as desired.

Figure 4:
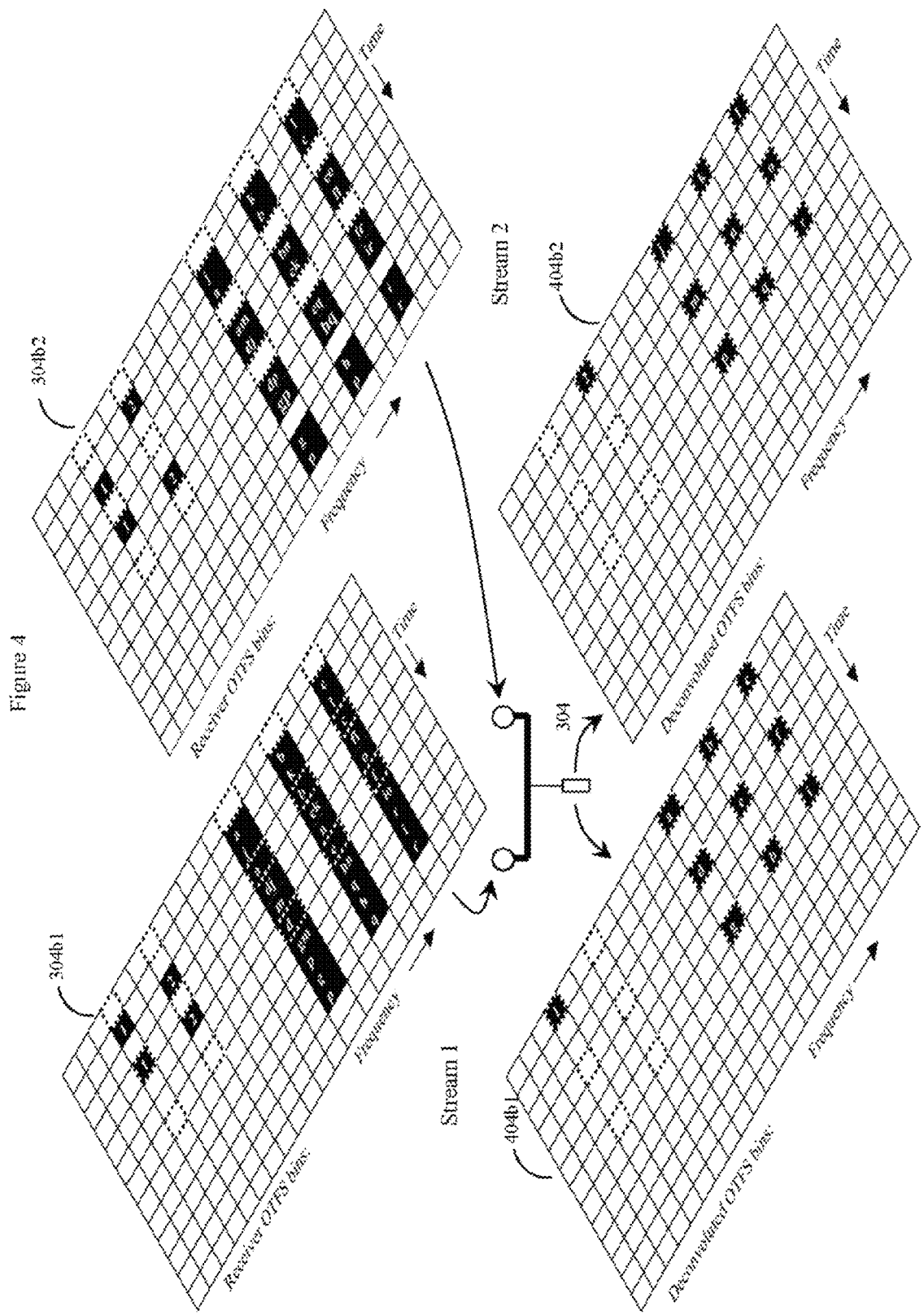
FIG. 4 shows an example of how after the MIMO receiver receives the two transmitted streams according to the OTFS bin structure on its right and left hand antennas. The MIMO receiver processor can use the known pilot symbols to compute the 2D channel state of the impaired data channel, and then use this to help deconvolute the OTFS data symbols as well.

FIG. 4 shows an example of how after the MIMO receiver receives the two transmitted streams according to the various OTFS bin structure (304b1, 304b2) on its right and left hand antennas (304a1, 304a2), the receiver processor can use the distribution of the known pilot symbols to compute the 2D channel state of the impaired data channel. The receiver processor can, for example, describe this 2D channel state as a 2D z-transform or other 2D transform, apply an inverse transform, and essentially deconvolute the channel convoluted OTFS pilot symbols and OTFS data symbols to reconstruct a cleaned-up receiver bin replica (404b1, 404b2) of the two streams of data originally transmitted by the MIMO transmitter. (Because the receiver's bin structure will often be higher resolution than the original transmitter grid, some mapping back to the original OTFS grid structure can then be done by the receiver processor)

Again, the invention's method essentially turns a nominal liability—data channel impairments, into an advantage because these impairments essentially provide a decoding key to help the receiver processor unscramble or deconvolute different data streams that otherwise might not be separable. In essence, the invention exploits data channel impairments to in effect increase the maximum data carrying capacity of the data channel.

Again, note that these at most T different streams may be carried by commonly shared OTFS carrier waveforms over the same ranges of times and frequencies. Indeed, this is part of the definition of "stream". Note that of course this does not disclaim the possibility of also using the T antennas to transmit wireless data by different schemes, such as different times, frequencies, OTFS carrier waveforms, and the like.

In some embodiments, the stream identifiable direct OTFS data and pilot bursts are also antenna identifiable and antenna specific. Here each transmitting antenna transmits an antenna specific stream of wireless OTFS data symbol waveforms along with a plurality of antenna specific identifiable wireless OTFS pilot symbol waveforms. However this is not a requirement. Indeed in other embodiments, which indeed may even be preferred embodiments, this scheme may be dropped and instead alternative schemes, which will be discussed shortly, may instead be adopted.

Methods Using a Combination of Polarization and MIMO Techniques

As previously discussed, in some embodiments, both polarization and MIMO techniques may be combined to produce still higher levels of performance. Here, for example, at least some of the previously described T uniquely configured transmitting antennas can also be configured as differently polarized transmitting antennas. In this configuration, the transmitter will further transmit its stream identifiable direct OTFS data and pilot bursts as polarized stream identifiable direct OTFS data and pilot bursts. These will be transmitted by the differently polarized transmitting antennas according to the different antenna polarization directions.

In this embodiment, as before, assume that at least one of the wireless reflectors are polarization altering wireless reflectors that alters a polarization direction of its reflected wireless OTFS waveform bursts according to a first reflector polarization operator. Thus this reflector produces polarized stream identifiable replica OTFS data and pilot bursts comprising polarization shifted time-delayed and reflector Doppler-shifted replicas of the original polarized stream identifiable direct OTFS data and pilot bursts.

In this embodiment, the receiver should have at least some of its R uniquely configured receiving antennas configured to detect a direction of polarization in the received wireless waveforms. As a result, at the wireless receiver, a resulting combination of any transmitter Doppler-shifted and receiver Doppler-shifted polarized stream identifiable direct OTFS data and pilot bursts, and polarized stream identifiable replica OTFS data and pilot bursts, will produce antenna specific channel-convoluted stream identifiable polarized OTFS data and pilot bursts.

According to the invention's techniques, the receiver uses at least some of the receiver's R uniquely configured receiving antennas to receive and detect the direction of polarization of these antenna specific channel-convoluted stream identifiable polarized OTFS data and pilot bursts. Generally for each wireless receiving antenna $R_a$ used in this process, and each stream identifiable plurality of OTFS pilot symbol waveforms, the receiver's processor can then analyze signals captured in the receiver's bins, and use the receiver processor to then determine the 2D channel state as seen at each receiving antenna $R_a$ being used. This 2D channel state information can then be used, as before, to deconvolute at least some of the antenna specific channel-convoluted stream identifiable polarized OTFS data and pilot bursts, thereby deriving at least an approximation of the originally transmitted plurality of data symbols. Alternatively or additionally, commands derived from the 2D channel state information, or some or all of the 2D channel state information, can be sent to the transmitter and used to precode at least some of the polarized stream identifiable direct OTFS data and pilot bursts to pre-compensate for the impaired data channel.

Transmitter Precoding Methods

As previously discussed, MIMO applications where multiple transmitting antennas are used to shape a spatial directionality of the transmitted wireless beam (e.g. select what directions will get peaks and nulls of the transmitted wireless waveforms) are well known in the art. Similarly MIMO applications where multiple receiving antennas are used to shape a spatial directionality in receiver sensitivity (e.g. select what directions will get enhanced sensitivity [peaks] and what directions will tend get diminished sensitivity [nulls] are well known in the art. Often such beam forming can be done using the previously discussed phase angle adjustment methods.

Such methods are not disclaimed here. Indeed in some embodiments, the previously discussed 2D channel state and precoding methods may be further used to shape a spatial directionality of the wireless waveforms transmitted by the T uniquely configured transmitting antennas. Alternatively or additionally, the 2D channel state information and previously discussed 2D channel state assisted deconvolution methods may also be used to shape a spatial directionality of the wireless waveforms received by the R uniquely configured receiving antennas.

As one example, this spatial directionality may be achieved by using the transmitter processor to adjust any of relative phases or angles of the wireless waveforms transmitted by the T uniquely configured transmitting antennas. Alternatively or additionally, the spatial directionality of the wireless waveforms received by the R uniquely configured receiving antennas may be achieved by using the receiver processor to monitor the relative phases or angles of the wireless waveforms received by the R uniquely configured receiving antennas.

Advanced Transmitter Precoding Methods

In some embodiments, where the system attempts to exploit the underlying structure of the data channel (e.g. position of various reflectors, other channel imperfections) to transmit more than one stream of data at the same time, it may also be desired to also use the multiple transmitting and receiving antennas to control the directionality of the wireless antenna beam (either at the transmitting or receiving end).

Here, it still will be useful to transmit stream identifiable OTFS data and pilot bursts, but if it is desired to use multiple antennas to control the directionality of the beam, in a preferred embodiment, it may not be desirable to transmit transmitting antenna identifiable signals. Instead, the transmitter processor may transmit the same stream identifiable OTFS data and pilot bursts through more than one antenna at the same time, in some embodiments with a varying phase delay or adjustment between the different antennas, thus providing directionality. The same principle can also be used by the receiver as well.

In these embodiments of the invention, the transmitter does not configure the stream identifiable direct OTFS data and pilot bursts to be antenna identifiable and or antenna specific. Instead, each different transmitting antenna may transmit at least one stream (e.g. often more than one stream) of wireless OTFS data symbol waveforms along the at least one stream identifiable wireless OTFS pilot symbol waveforms.

For example, in such embodiments, each transmitting antenna may transmits at least one stream of wireless OTFS data symbol waveforms along with at least one stream identifiable wireless OTFS pilot symbol waveforms according to various transmitting antenna specific phases or power settings. This in effect thereby shapes a spatial directionality to the wireless waveforms transmitted by those transmitting antennas that are transmitting that particular stream.

Further Details of OTFS Waveform Structure and OTFS Burst Structure

In some embodiments, the OTFS waveforms bursts may be produced and structured according to methods previously discussed in patent applications U.S. 61/349,619, U.S. Ser. No. 13/177,119, U.S. Ser. Nos. 13/430,690 and 13/927,091 as well as U.S. Pat. Nos. 8,547,988 and 8,879,378; the complete contents of all of which are incorporated herein by reference in their entirety. Some specific examples of some of these embodiments are discussed below.

Figure 6:
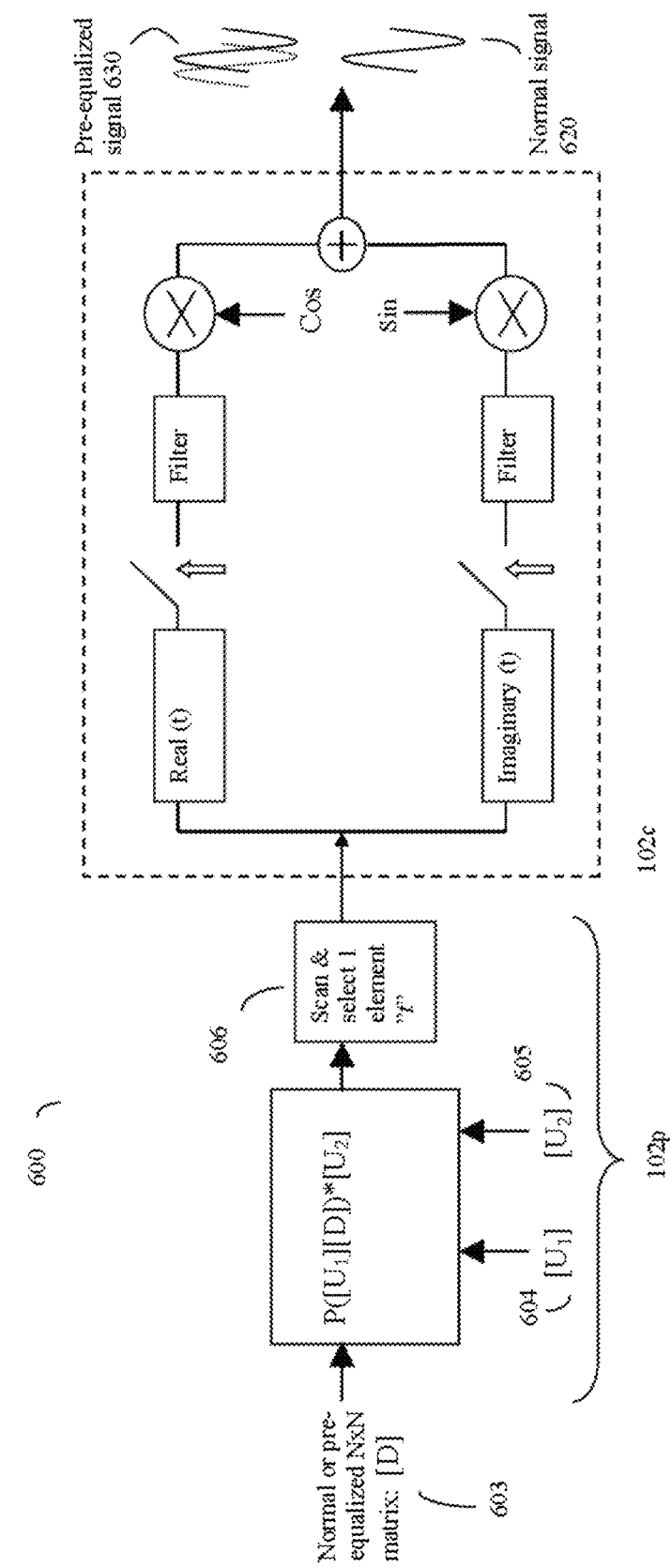
FIG. 6 shows an example of an OTFS transmitter using a processor (see FIG. 1B) to transmit a series of N consecutive OTFS waveform bursts.

FIG. 6 shows an example of circuitry useful to implement an OTFS transmitter transmitting a series of N consecutive OTFS waveform bursts (previously called blocks in parent application Ser. No. 13/430,690). In some embodiments, the transmitter may further incorporate a pre-equalization step to pre-compensate for various communications channel impairments such as echo reflections and frequency shifts.

This transmitter can comprise a more digitally oriented computation end (e.g. previously discussed 102p) (which may use a processor and memory) and a more analog signal oriented modulation end (previously discussed 102c). At the digital end (102p), an electronic circuit, which may be a microprocessor, digital signal processor, or other similar device will accept as input the data matrix [D] (603) and may either generate or accept as inputs the [$U_1$] (604) (e.g. a DFT/IDFT matrix) and [$U_2$] (605) (e.g. the encoding matrix U as discussed elsewhere) matrices as well as the permutation scheme P, previously described here and in parent application Ser. No. 13/117,119, again incorporated herein by reference, as well as in the example later on in the document. The digital section will then generate what was referred to in '119 as the TFSSS matrix (and here referred to as an OTFS matrix), and what can alternatively be termed the OTFS (time/frequency shift) matrix. Once generated, individual elements from this matrix may be selected, often by first selecting one column of N elements from the OTFS matrix, and then scanning down this column and picking out individual elements at a time (606). Generally one new element will be selected every time block. Other scanning schemes can also be used.

Thus every successive time slice, one element from the OTFS matrix (608) can be used to control the modulation circuit (102c). In one embodiment of the invention, the modulation scheme will be one where the element will be separated into its real and imaginary components, chopped and filtered, and then used to control the operation of a sin and cosine generator, producing a composite analog waveform (620). The net, effect, by the time that the entire original N×N data symbol matrix [D] is transmitted, is to transmit the data in the form of $N^2$ summation-symbol-weighted cyclically time shifted and cyclically frequency shifted waveforms, structured as N composite waveform bursts. In the example shown in FIG. 6, the data is transmitted over N consecutive waveform bursts over N time blocks. However as discussed elsewhere, other schemes are also possible, such as schemes in which some of composite waveforms are transposed to a different frequency range, and transmitted in parallel at the same time. In general the composite waveforms may be transmitted over any combination of N time blocks or frequency blocks.

In some embodiments, at the transmitter end, a microprocessor controlled transmitter may package a series of different symbols "d" (e.g. $d_1$, $d_2$, $d_3$ ... ) for transmission by repackaging or distributing the symbols into various elements of various N·N matrices [D] by, for example assigning $d_1$ to the first row and first column of the [D] matrix (e.g. $d_1=d_{0,0}$), $d_2$ to the first row second column of the [D] matrix (e.g. $d_2=d_{0,1}$) and so on until all N·N symbols of the [D] matrix are full. Here, once we run out of d symbols to transmit, the remaining [D] matrix elements can be set to be 0 or other value indicative of a null entry.

The various primary waveforms used as the primary basis for transmitting data, which here will be called "tones" to show that these waveforms have a characteristic sinusoid shape, can in some embodiments be described by an N·N Inverse Discrete Fourier Transform (IDFT) matrix [W], where for each element w in [W], $$w_{j,k} = e^{\frac{i2\pi jk}{N}}$$

or alternatively $w_{j,k}=e^{ij\Theta_k}$ or $w_{j,k}=[e^{i\Theta_k}]^j$. Thus the individual data elements d in [D] are transformed and distributed as a combination of various fundamental tones w by schemes such as a matrix multiplication operation [W]*[D], producing a tone transformed and distributed form of the data matrix, here described by the N·N matrix [A], where [A]=[W]*[D].

To produce the invention's N cyclically time shifted and N cyclically frequency shifted waveforms, the tone transformed and distributed data matrix [A] may then itself be further permuted, for example using modular arithmetic or "clock" arithmetic, creating an N·N matrix [B], where for each element of b of [B], $b_{i,j}=a_{i,(i+j)\bmod N}$. This can alternatively be expressed as [B]=Permute([A])=P(IDFT*[D]). Thus in some embodiments, this clock arithmetic can control the pattern of cyclic time and frequency shifts.

In some embodiments, a unitary matrix [U] can then be used to operate on [B], producing an N·N transmit matrix [T], where [T]=[U]*[B], thus producing a $N^2$ sized set of all permutations of N cyclically time shifted and N cyclically frequency shifted waveforms determined according to an encoding matrix [U]. Put alternatively, in these embodiments, the N·N transmit matrix [T]=[U]*P(IDFT*[D]). This N·N transmit matrix can be viewed as corresponding to the previously discussed transmitter OTFS time-frequency grid.

In these embodiments, often on a per column basis, each individual column of N can be used by the transmitter processor and transmitter to further modulate a frequency carrier wave (e.g. if we are transmitting in a range of frequencies around 1 GHz, the carrier wave will be set at 1 GHz), and each column the N·N matrix [T] which has N elements, may thus produce N symbol-weighted cyclically time shifted and cyclically frequency shifted waveform bursts for each data symbol. In these embodiments, the transmitter is transmitting the sum of the N symbol-weighted cyclically time shifted and cyclically frequency shifted waveforms from one column of [T] at a time as, for example, a composite waveform over a time block of data, thus creating a waveform "burst".

Alternatively the transmitter could instead use a different frequency carrier wave for the different columns of [T], and thus for example transmit one column of [T] over one frequency carrier wave, and simultaneously transmit a different column of [T] over a different frequency carrier wave, thus transmitting more data at the same time, although of course using more bandwidth to do so. This alternative method of using different frequency carrier waves to transmit more than one column of [T] at the same time will be referred to as frequency blocks, where each frequency carrier wave burst is considered its own frequency block.

Thus, in some embodiments, since the N·N matrix [T] has N columns, the transmitter will transmit the $N^2$ summation-symbol-weighted cyclically time shifted and cyclically frequency shifted waveforms, structured as N composite waveform bursts, over any combination of N time blocks or frequency blocks.

Figure 7:
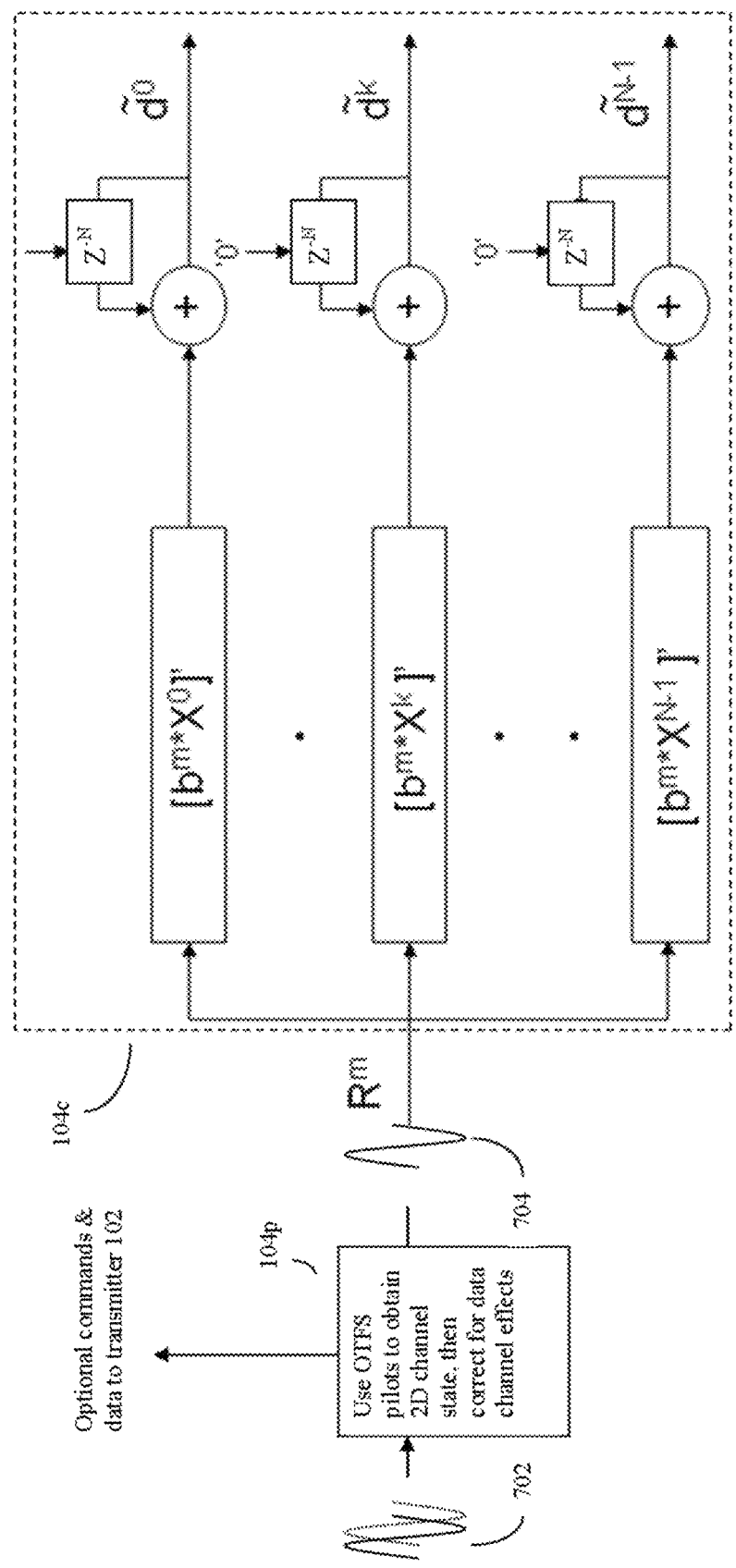
FIG. 7 shows an example of an OTFS receiver. As previously discussed, this receiver will normally be controlled by a receiver processor (see FIG. 1B) and associated memory so that the receiver can simultaneously track incoming OTFS waveforms at a plurality of times and frequencies according to the previously described OTFS receiver bin structure.

FIG. 7 shows an example of circuitry (such as 104c) useful to implement an OTFS receiver. As previously discussed, this receiver will normally be controlled by a receiver processor (104p) and associated memory so that the receiver can simultaneously track incoming OTFS waveforms at a plurality of times and frequencies according to the previously described OTFS receiver bin structure, as well as optionally also monitor any of polarization on multiple antennas, waveform phase on multiple antennas, or direction of incidence on multiple antennas, and send the results to the receiver processor and memory for further analysis as discussed elsewhere in this specification.

On the receiver side, the transmit process is essentially reversed. Here, for example, a microprocessor controlled receiver would of course receive the various columns [T] (e.g. receive the N composite waveform bursts, also known as the N symbol-weighted cyclically time shifted and cyclically frequency shifted waveform bursts) (702) into the various OTFS time-frequency receiver bins over various time blocks or frequency blocks as desired for that particular application. If for example there is a lot of available bandwidth and time is of the essence, then the transmitter will transmit, and the receiver will receive, the data as multiple frequency blocks over multiple frequency carrier waves. On the other hand, if available bandwidth is more limited, and/or time (latency) is less critical, then the transmit will transmit and the receiver will receive over multiple time blocks instead.

Note that as previously discussed, the receiver bin structure may often be finer (e.g. higher resolution) than the underlying OTFS N·N transmission or receiving matrix. According to the invention, this higher resolution will typically be used for 2D channel state characterization, deconvoluting data channel impairments, and the like. Once the previously described 2D channel state methods are used to clean up the received data according to the receiver bin structure, the data from the cleaned up receiver bins (704) can then be mapped (usually using the receiver processor) into the N·N receive matrix [R], and the original transmitted data extracted as discussed below.

So effectively the receiver tunes into the one or more frequency carrier waves, and over the number of time and frequency blocks set for that particular application eventually receives the data or coefficients from original N·N transmitted matrix [T] as into the receiver bin structure, cleans up this data using the 2D channel effects, and then maps the cleaned up data into the N·N receive matrix [R] where [R] is similar to [T], but may not be identical due to various remaining communications impairments.

In some embodiments, the microprocessor controlled receiver can then reverse the transmit process by a series of steps that mimic, in reverse, the original transmission process. The N·N receive matrix [R] may first be decoded by inverse decoding matrix $[U^H]$, producing an approximate version of the original permutation matrix [B], here called $[B^R]$, where $[B^R]=([U^H]*[R])$.

The receiver then, for example, can do an inverse clock operation to back out the data from the cyclically time shifted and cyclically frequency shifted waveforms (or tones) by doing an inverse modular mathematics or inverse clock arithmetic operation on the elements of the N·N $[B^R]$ matrix, producing, for each element $b^R$ of the N·N $[B^R]$ matrix, $a_{i,j}^R \cdot b_{i,(j-i) \mod N}^R$. This produces a "de-cyclically time shifted and de-cyclically frequency shifted" version of the tone transformed and distributed form of the data matrix [A], here called $[A^R]$. Put alternatively, $[A^R]$=Inverse Permute $([B^R])$, or $[A^R]=P^{-1}([U^H]*[R])$.

In some embodiments, the receiver processor (104p) can then further extract at least an approximation of the original data symbols d from the $[A^R]$ matrix by analyzing the [A] matrix using (for example) an N·N Discrete Fourier Transform matrix DFT of the original Inverse Fourier Transform matrix (IDFT).

Here, for each received symbol $d^R$, the $d^R$ are elements of the N·N received data matrix $[D^R]$ where $[D^R]=DFT*A^R$, or alternatively $[D^R]=DFT*P^{-1}([U^H]*[R])$.

Thus the original $N^2$ summation-symbol-weighted cyclically time shifted and cyclically frequency shifted waveforms are transmitted according to the transmitter OTFS grid, along with OTFS pilot waveform bursts. During transmission, all waveform bursts are subject to the various data channel impairments as previously described. The receiver receives the various OTFS waveform bursts according to the receiver bin structure, and uses the OTFS pilot waveform bursts to determine the 2D channel state of the data channel. The receiver can then use this 2D channel state to further clean up (deconvolute) the received OTFS data bursts, and then map the deconvoluted OTFS data bursts back into the receiver N·N receive matrix [R].

Once this occurs, the receiver processor and memory can use a corresponding decoding matrix $U^H$ (also represented as $[U^H]$) to complete the process of backing out the original data from the received OTFS symbols. Here the receiver (e.g. the receiver's microprocessor and associated software) can use this decoding matrix $[U^H]$ to reconstruct the various transmitted symbols "d" in the one or more originally transmitted N·N symbol matrices [D] (or at least an approximation of these transmitted symbols).

The invention claimed is:

1. An automated method of acquiring a 2D channel state of an impaired data channel connecting at least one transmitter and at least one receiver, said impaired data channel comprising at least one reflector, each said at least one reflector comprising a reflector location, reflector frequency shift, and at least one reflector coefficients of reflection;

each said at least one transmitter comprising a transmitter location and transmitter frequency shift;

each said at least one receiver comprising a receiver location and receiver frequency shift;

wherein said 2D channel state comprises information pertaining to relative locations, frequency shifts, and reflector coefficients of reflection of said at least one transmitters, receivers, and reflectors;

said method comprising:

using said at least one transmitter and at least one processor to transmit direct OTFS pilot bursts, said direct OTFS pilot bursts comprising a plurality of OTFS pilot symbols $P_{pt,pf}$ transmitted as OTFS pilot symbol waveform bursts $P_{pt,pf} \cdot W_p(pt, pf)$, over a plurality of combinations of times pt and frequencies pf, where each said pt and pf are unique pilot time-frequency coordinates chosen from a two dimensional pilot OTFS time-frequency grid, and all said OTFS pilot symbol waveform bursts $P_{pt,pf} \cdot W_p(pt, pf)$ are mutually orthogonal waveform bursts derived from cyclically time and frequency shifted versions of a same OTFS pilot basis waveform $W_p$;

said receiver configured to receive at least said pilot bursts according to at least a two dimensional pilot OTFS time-frequency bin structure with bin sizes and bin-coordinate positions proportional to said OTFS time-frequency grid;

wherein upon propagation through said impaired data channel, said direct OTFS pilot bursts then travel over at least one path, said at least one path comprising at least one of:

a: direct OTFS pilot bursts traveling directly from said at least one transmitter to said at least one receiver; and b: replica OTFS pilot bursts comprising direct OTFS pilot bursts that have reflected off of said at least one reflector before reaching said at least one receiver, thereby producing direct OTFS waveform bursts that are further reflector time-delayed and reflector frequency-shifted at said at least one receiver;

wherein at said at least one receiver, a resulting combination of any said transmitter frequency shifted and receiver frequency shifted direct OTFS pilot bursts and any said replica OTFS pilot bursts produces channel-convoluted OTFS pilot bursts;

at said at least one receiver, using said bin structure to receive said channel-convoluted OTFS pilot bursts and using at least one processor to determine said 2D channel state of said impaired data channel connecting said at least one transmitter and said at least one receiver.

2. The method of claim 1, wherein prior to transmission, said plurality of OTFS pilot symbols $P_{pt,pf}$, and two dimensional pilot OTFS time-frequency grid and bin structure are chosen so that if, after transmission by said at least one transmitter, said impaired data channel subsequently causes at least some of said OTFS pilot symbol waveform bursts $P_{t1,f1} \cdot W_p(t1, f1)$ originally transmitted at a first time-frequency coordinate to be projected onto different OTFS pilot symbol waveform bursts $P_{t2,f2} \cdot Wp(t2, f2)$ originally transmitted at a different time-frequency coordinate, and bins different from those nominally corresponding to said OTFS pilot symbol waveform bursts $P_{t1,f1} \cdot W_p(t1, f1)$, at least some of said projections will be detectable and quantifiable by said at least one receiver.

3. The method of claim 2, wherein said plurality of OTFS pilot symbols $P_{pt,pf}$ transmitted as OTFS pilot symbol waveform bursts $P_{pt,pf} \cdot W_p(pt, pf)$ comprise at least one non-null OTFS pilot symbol $P_{pt,pf}$ transmitted as an OTFS pilot symbol waveform burst $P_{pt,pf} \cdot W_p(pt, pf)$ with sufficient power to be detectable by said at least one receiver; and any of:

1: at least some of said plurality of OTFS pilot symbols are null pilot symbols intended to create empty pt and pf unique pilot time-frequency coordinates chosen from said two dimensional pilot OTFS time-frequency grid, where no waveform burst is transmitted; or 2: at least some of said plurality of OTFS pilot symbols are background pilot symbols intended to create a uniform background of pt and pf unique pilot time-frequency coordinates chosen from said two dimensional pilot OTFS time-frequency grid to enable projections of channel-convoluted non-null OTFS pilot bursts onto said uniform background to be detectable and quantifiable by said at least one receiver.

4. The method of claim 1, wherein said 2D channel state is at least partially determined by using at least one 2D impulse response to mathematically describe how said impaired data channel causes at least some of said OTFS pilot symbol waveform bursts $P_{t1,f1} \cdot W_p(t1, f1)$ transmitted at a first time-frequency coordinate to be projected onto different OTFS pilot symbol waveform bursts $P_{t2,f2} \cdot Wp(t2, f2)$ originally transmitted at a different time-frequency coordinate, and bins different from those nominally corresponding to said OTFS pilot symbol waveform bursts $P_{t1,f1} \cdot W_p(t1, f1)$.

5. The method of claim 4, further using a plurality of said 2D impulse responses from a plurality of said bins to at least partially describe said 2D channel state as at least one 2D transform comprising at least one of a 2D Z-transform or other 2D transform.

6. The method of claim 1, wherein said 2D channel state comprises a matrix or other mathematical transform for said impaired data channel describing how all signals transmitted by said transmitter are coupled with all signals from said transmitter that are received by said receiver.

7. The method of claim 1, wherein said plurality of OTFS pilot symbols $P_{pt,pf}$ are known by said at least one receiver, and wherein said plurality of OTFS pilot symbols are further chosen to be any of: one or two dimensional m-sequences comprising binary maximal-length shift register sequences, delta values $P_{i,j}$ surrounded by regions of $P_{pt,pf}$ zero values, one or two dimensional Barker codes, Costas arrays, Walsh matrixes, or other plurality of pilot symbols selected to facilitate acquiring said 2D channel state; and wherein said bins have time-frequency resolutions that are equal to or more precise than time-frequency resolutions of said grid.

8. The method of claim 1, further transmitting a plurality of data symbols through said impaired data channel by using said at least one transmitter and at least one processor to also transmit at least some of said plurality of data symbols as direct data bursts comprising a plurality of data carrying waveform bursts, and to transmit said direct data bursts along with said direct OTFS pilot bursts to said at least one receiver;

wherein said direct data bursts also are reflected off of said at least one reflector, thereby producing replica data bursts comprising time-delayed and reflector frequency-shifted direct data bursts at said at least one receiver, and wherein at said at least one receiver, a resulting combination of any said transmitter frequency shifted and receiver frequency shifted direct data bursts, and replica data bursts, produce channel-convoluted data bursts;

using said 2D channel state and at least one processor to further perform at least one of:

a) precoding at least some of said direct data bursts at said at least one transmitter to pre-compensate for said impaired data channel; and b) deconvoluting at least some of said channel-convoluted data bursts at said at least one receiver, thereby deriving at least an approximation of said plurality of data symbols.

9. The method of claim 8, wherein said direct data bursts transmit at least some of said plurality of data symbols as direct OTFS data bursts comprising a plurality of OTFS data symbols $D_{dt,df}$ transmitted as OTFS data symbol waveform bursts $D_{dt,df} \cdot W_d(dt, df)$ over a plurality of combinations of times dt and frequencies df, where each said dt and df are unique data time-frequency coordinates (dt, df) chosen from a two dimensional OTFS data time-frequency grid, and all said OTFS data symbol waveform bursts $D_{dt,df} \cdot W_d(dt,df)$ comprise originally transmitted OTFS data symbols $D_{dt,df}$ transmitted by mutually orthogonal waveform bursts derived from cyclically time and frequency shifted versions of a same OTFS data basis waveform $W_d$, and wherein each data symbol is distributed over a plurality of OTFS data symbols $D_{dt,df}$;
wherein said channel-convoluted data bursts are channel-convoluted OTFS data bursts;
wherein individual data symbols in said plurality of data symbols are encoded into a plurality of OTFS data symbols $D_{dt,df}$ at said transmitter prior to transmission, said encoding configured so that said receiver must successfully receive a plurality of OTFS data symbols $D_{dt,df}$ to provide enough information to determine said individual data symbols;
wherein said plurality of said OTFS data symbol waveform bursts $D_{dt,df} \cdot W_d(dt, df)$ are mutually orthogonal waveform bursts derived from a same OTFS data basis waveform $W_d$; and
wherein said bin structure further encompasses said two dimensional OTFS data time-frequency grid.

10. The method of claim 9, wherein said OTFS data symbol waveform bursts $D_{dt,df} \cdot W_d(dt, df)$ and said plurality of said OTFS pilot symbol waveform bursts $P_{pt,pf} \cdot W_p(pt, pf)$ are chosen from a common plurality of times t and frequencies f, where each said t and f are unique time-frequency coordinates (t, f) chosen from a common grid of two dimensional OTFS time-frequency coordinates;
wherein said time-frequency coordinates (td, fd) for said OTFS data symbol waveform bursts are further chosen to not overlap with the time-frequency coordinates (pt, pf) for said OTFS pilot symbol waveform bursts.

11. The method of claim 10, wherein said OTFS data OTFS data symbol waveform bursts $D_{dt,df} \cdot W_d(dt,df)$ and said plurality of OTFS pilot symbols $P_{pt,pf}$ transmitted as OTFS pilot symbol waveform bursts $P_{pt,pf} \cdot W_p(pt, pf)$ do not occupy all unique time-frequency coordinates (dt, df) chosen from said two dimensional OTFS data time-frequency grid.

12. The method of claim 10, wherein said OTFS data OTFS data symbol waveform bursts $D_{dt,df} \cdot W_d(dt,df)$ and said plurality of OTFS pilot symbols $P_{pt,pf}$ transmitted as OTFS pilot symbol waveform bursts $P_{pt,pf} \cdot W_p(pt, pf)$ not all transmitted at the same power level, but instead some OTFS data symbol waveform bursts or some OTFS pilot symbol waveform bursts are sent at power levels chosen according to at least said 2D channel state, distance to said at least one receiver, or sensitivity of said at least one receiver.

13. The method of claim 10, wherein said time-frequency coordinates (td, tf) for said OTFS data symbol waveform bursts are further chosen to either surround or to be adjacent to the time-frequency coordinates (pt, pf) for said OTFS pilot symbol waveform bursts; and
wherein said OTFS pilot basis waveform $W_p$ and said OTFS data basis waveform $W_d$ are chosen to be the same basis waveform.

14. The method of claim 1, wherein said impaired data channel is an optical fiber data channel comprising at least one optical fiber, an electrically conducting wire data channel comprising at least one metallic electrical conductor, or a data channel comprising a fluid.

15. The method of claim 1, wherein said impaired data channel is a wireless data channel, said transmitter is a wireless transmitter, said receiver is a wireless receiver, said reflector is a wireless reflector further comprising a reflector velocity, said reflector frequency shift is a receiver velocity Doppler shift, and said at least one reflector coefficient of reflection is a reflector coefficient of wireless reflection;
said transmitter has a transmitter velocity, and said transmitter frequency is at least partially determined by a transmitter Doppler shift that varies according to said transmitter velocity;
said receiver has a receiver velocity, and said receiver frequency is at least partially determined by a receiver Doppler shift that varies according to said receiver velocity;
said direct OTFS pilot bursts comprise a plurality of wireless OTFS pilot symbol waveform bursts; and
wherein, said 2D channel state comprises information pertaining to relative locations, velocities, velocity induced frequency shifts caused by transmitter Doppler shifts, receiver Doppler shifts, reflector Doppler shifts, and reflector coefficients of reflection of said at least one transmitters, receivers, and reflectors.

16. The method of claim 15, further transmitting a plurality of data symbols through said impaired data channel by using said at least one wireless transmitter and at least one processor to also transmit at least some of said plurality of data symbols as direct data bursts comprising wireless data carrying waveform bursts, to said at least one wireless receiver;
wherein said direct data bursts also are reflected off of said at least one wireless reflector,
thereby producing replica data bursts comprising direct data bursts that are further reflector time-delayed and reflector velocity Doppler-shifted at said at least one wireless receiver, and wherein at said at least one wireless receiver, a resulting combination of any said transmitter Doppler-shifted and receiver Doppler-shifted direct data bursts and replica data bursts produce channel-convoluted data bursts;
using said 2D channel state and at least one processor to further perform at least one of:
a) precoding at least some of said direct data bursts at said at least one wireless transmitter to pre-compensate for said impaired data channel; and
b) deconvoluting at least some of said channel-convoluted data bursts at said at least one wireless receiver, thereby deriving at least an approximation of said plurality of data symbols;
wherein said data symbols and wireless data carrying waveform bursts are transmitted by any of TDMA, GSM, FDMA, OFDM, CDMA, OTFS wireless waveform bursts, or other types of wireless waveform bursts.

17. The method of claim 16, wherein said precoding or said deconvoluting is done by using at least one 1D projection of said 2D channel state along any of a time axis, frequency axis, or time-frequency axis.

18. The method of claim 16, wherein said at least one wireless transmitter transmits said direct OTFS pilot bursts as polarized direct OTFS pilot bursts comprising polarized wireless OTFS pilot symbol waveform bursts according to at least one polarization direction;
said at least one wireless reflector is a polarization altering wireless reflector that alters a polarization direction of its reflected wireless OTFS waveform bursts according to a first reflector polarization operator, thereby producing replica polarized OTFS pilot bursts that comprise polarization shifted time-delayed and reflector Doppler-shifted replicas of said polarized direct OTFS pilot bursts;
said at least one wireless receiver is further configured to detect a direction of polarization in its received wireless waveforms;

and wherein at said at least one wireless receiver, a resulting combination of any said transmitter Doppler-shifted, receiver Doppler-shifted, and receiver polarized direct OTFS pilot bursts and replica polarized OTFS pilot bursts produce channel-convoluted polarized OTFS pilot bursts;

receiving said channel-convoluted polarized OTFS pilot bursts and detecting their direction of polarization;

further using said direction of polarization of said channel-convoluted polarized OTFS pilot bursts to further determine said 2D channel state of said impaired data channel.

19. The method of claim 16, wherein said direct data bursts are direct OTFS data bursts comprising OTFS data symbols transmitted by OTFS wireless data symbol waveform bursts;

said wireless transmitter has T uniquely configured transmitting antennas, and said wireless receiver has R uniquely configured receiving antennas, both T and R being greater than 1, and R being greater than or equal to T;

said wireless transmitter configured to use its T transmitting antennas to simultaneously transmit, over a same frequency range, at most T streams of stream identifiable direct OTFS data and pilot bursts, each stream identifiable direct OTFS data and pilot bursts having at least OTFS pilot symbols $P_{s,pt,pf}$ further chosen to be stream identifiable;

wherein at said at least one wireless receiver antenna $R_a$, a resulting combination of any said transmitter Doppler-shifted and receiver Doppler-shifted stream identifiable direct OTFS data and pilot bursts, and replica stream identifiable direct OTFS data and pilot bursts, produce receiving antenna specific channel-convoluted stream identifiable OTFS data and pilot bursts;

wherein said T transmitting antennas and R receiving antennas receiving antennas are configured so that said R receiving antennas receive different receiving antenna specific channel-convoluted stream identifiable OTFS data and pilot bursts with detectably different 2D channel states;

further improving an efficiency of successfully transmitting said at most T streams of data to said wireless receiver by:

at said receiver, using said R receiving antennas to receive said antenna specific channel-convoluted stream identifiable OTFS data and pilot bursts;

for each wireless receiving antenna R and each stream identifiable plurality of OTFS pilot symbol waveforms, using a receiver processor to determine said 2D channel state at said receiving antenna, thereby determining stream specific 2D channel states, and use said stream specific 2D channel state to perform at least one of:

a) precoding at least some of said stream identifiable direct OTFS data and pilot bursts at said at least one transmitter to pre-compensate for said impaired data channel; and b) deconvoluting at least some of said antenna specific channel-convoluted stream identifiable OTFS data and pilot bursts at said at least one receiver, thereby deriving at least an approximation of said plurality of data symbols.

20. The method of claim 19, wherein determining said 2D channel state further comprises using at least one 2D impulse response to mathematically describe how, for said stream identifiable direct OTFS data and pilot bursts, stream-1 OTFS pilot symbol waveform bursts $P_{s1,t1,f1} \cdot Wp(t1,f1)$ transmitted at a first time-frequency coordinate to be projected onto different stream-2 OTFS pilot symbol waveform bursts $P_{s2,t2,f2} \cdot Wp(t2,f2)$ originally transmitted at a different time-frequency coordinate, and bins different from those normally corresponding to said stream 1 OTFS pilot symbol waveform bursts $P_{s1,t1,f1} \cdot Wp(t1,f1)$, according to a receiving antenna specific aspect of said impaired data channel, thereby determining, for each stream, R receiving antenna specific 2D impulse responses;

and using said R receiving antenna specific 2D impulse responses to either precode said streams at said transmitter, or deconvolute said receiving antenna specific channel-convoluted stream identifiable OTFS data and pilot bursts.

21. The method of claim 19, wherein at least some of said T uniquely configured transmitting antennas are differently polarized transmitting antennas, and wherein said stream identifiable direct OTFS data and pilot bursts are polarized stream identifiable direct OTFS data and pilot bursts that are transmitted by said differently polarized transmitting antennas are according to different polarization directions;

said at least one wireless reflector is a polarization altering wireless reflector that alters a polarization direction of its reflected wireless OTFS waveform bursts according to a first reflector polarization operator, thereby producing polarized stream identifiable replica OTFS data and pilot bursts comprising polarization shifted time-delayed and reflector Doppler-shifted replicas of said polarized stream identifiable direct OTFS data and pilot bursts;

said at least one receiver has at least some of its R uniquely configured receiving antennas configured to detect a direction of polarization in its received wireless waveforms;

wherein at said at least one wireless receiver, a resulting combination of any said transmitter Doppler-shifted and receiver Doppler-shifted polarized stream identifiable direct OTFS data and pilot bursts, and polarized stream identifiable replica OTFS data and pilot bursts, produce antenna specific channel-convoluted stream identifiable polarized OTFS data and pilot bursts;

further using at least some of said receiver's R uniquely configured receiving antennas to receive and detect the direction of polarization of said antenna specific channel-convoluted stream identifiable polarized OTFS data and pilot bursts;

for each wireless receiving antenna $R_a$ and each stream identifiable plurality of OTFS pilot symbol waveforms, using a receiver processor to determine said 2D channel state at said receiving antenna $R_a$, and use said 2D channel states to perform at least one of:

a) precoding at least some of said polarized stream identifiable direct OTFS data and pilot bursts at said at least one transmitter to pre-compensate for said impaired data channel; and b) deconvoluting at least some of said antenna specific channel-convoluted stream identifiable polarized OTFS data and pilot bursts at said at least one receiver, thereby deriving at least an approximation of said plurality of data symbols.

22. The method of claim 19, wherein said 2D channel state and said precoding is further used to shape a spatial directionality of the wireless waveforms transmitted by said T uniquely configured transmitting antennas, or wherein said 2D channel state and said deconvoluting is used to shape a spatial directionality of the wireless waveforms received by said R uniquely configured receiving antennas.

23. The method of claim 22, wherein said spatial directionality is achieved by adjusting any of relative phases or angles of the wireless waveforms transmitted by said T uniquely configured transmitting antennas, or wherein said spatial directionality of the wireless waveforms received by said R uniquely configured receiving antennas is achieved by monitoring the relative phases or angles of the wireless waveforms received by said R uniquely configured receiving antennas.

24. The method of claim 19, wherein said at most T different streams are carried by commonly shared OTFS carrier waveforms over a same ranges of times and frequencies.

25. The method of claim 19, wherein each said stream identifiable direct OTFS data and pilot bursts are not antenna identifiable and not antenna specific, and each transmitting antenna transmits at least one stream of wireless OTFS data symbol waveforms along with at least one stream identifiable wireless OTFS pilot symbol waveforms.

26. The method of claim 25, wherein each transmitting antenna transmits at least one stream of wireless OTFS data symbol waveforms along with at least one stream identifiable wireless OTFS pilot symbol waveforms according to a transmitting antenna specific phase or power setting, thereby shaping a spatial directionality of the wireless waveforms transmitted by those transmitting antennas transmitting said stream.

27. The method of claim 19, wherein said stream identifiable direct OTFS data and pilot bursts are also antenna identifiable and antenna specific, and each transmitting antenna transmits an antenna specific stream of wireless OTFS data symbol waveforms along with a plurality of antenna specific identifiable wireless OTFS pilot symbol waveforms.

* * * * *